(12) United States Patent
Berry et al.

(10) Patent No.: US 11,614,233 B2
(45) Date of Patent: Mar. 28, 2023

(54) IMPINGEMENT PANEL SUPPORT STRUCTURE AND METHOD OF MANUFACTURE

(71) Applicant: General Electric Company, Schenectady, NY (US)

(72) Inventors: Jonathan Dwight Berry, Simpsonville, SC (US); Jerome Walter Goike, Greenville, SC (US); Clay Thomas Griffis, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/007,108

(22) Filed: Aug. 31, 2020

(65) Prior Publication Data

US 2022/0065452 A1     Mar. 3, 2022

(51) Int. Cl.
    *F23R 3/00*     (2006.01)
    *F23R 3/28*     (2006.01)

(52) U.S. Cl.
    CPC ........ *F23R 3/002* (2013.01); *F05D 2260/201* (2013.01); *F05D 2260/22141* (2013.01); *F23R 3/283* (2013.01); *F23R 2900/03044* (2013.01)

(58) Field of Classification Search
None
See application file for complete search history.

(56) References Cited

U.S. PATENT DOCUMENTS 2,595,999 A    5/1952   Way et al.
2,625,792 A    1/1953   McCarthy et al.
(Continued)

FOREIGN PATENT DOCUMENTS

EP      0805308 A1    11/1997
EP      0815995 A2     1/1998
(Continued)

OTHER PUBLICATIONS

Nishimura et al., The Approach to The Development of The Next Generation Gas Turbine and History of Tohoku Electric Power Company Combined Cycle Power Plants, GT2011-45464, Proceedings of ASME Turbo Expo 2011, Vancouver, Britsh Columbia, Canada, Jun. 6-10, 2011, pp. 1-6.
(Continued)

*Primary Examiner* — Gerald L Sung
*Assistant Examiner* — Alyson Joan Harrington
(74) *Attorney, Agent, or Firm* — Dority & Manning, P.A.

(57) ABSTRACT

An integrated combustor nozzle includes a combustion liner that extends between an inner liner segment and an outer liner segment along a radial direction. The combustion liner including a forward end portion, an aft end portion, a first side wall, and a second side wall. An impingement panel having an impingement plate disposed along an exterior surface of one of the inner liner segment or the outer liner segment. The impingement plate defines a plurality of impingement apertures that direct coolant in discrete jets towards the exterior surface of the inner liner segment or the outer liner segment. The impingement panel includes an inlet portion that extends from the impingement plate to a collection duct. The impingement panel further includes a plurality of supports spaced apart from one another. The plurality of supports extend between, and are coupled to, the inlet portion, the collection duct, and the impingement plate.

11 Claims, 25 Drawing Sheets

(56) References Cited

U.S. PATENT DOCUMENTS

| | | |
|---|---|---|
| 3,433,015 A | 3/1969 | Sneeden |
| 3,584,972 A | 6/1971 | Bratkovich et al. |
| 3,657,882 A | 4/1972 | Hugoson |
| 3,657,883 A | 4/1972 | DeCorso |
| 3,750,398 A | 8/1973 | Adeelizzi et al. |
| 4,016,718 A | 4/1977 | Lauck |
| 4,112,676 A | 9/1978 | DeCorso |
| 4,158,949 A | 6/1979 | Reider |
| 4,195,474 A | 4/1980 | Bintz et al. |
| 4,253,301 A | 3/1981 | Vogt |
| 4,297,843 A | 11/1981 | Sato et al. |
| 4,373,327 A | 2/1983 | Adkins |
| 4,413,470 A | 11/1983 | Scheihing et al. |
| 4,422,288 A | 12/1983 | Steber |
| 4,498,288 A | 2/1985 | Vogt |
| 4,566,268 A | 1/1986 | Hoffeins et al. |
| 4,614,082 A | 9/1986 | Sterman et al. |
| 4,719,748 A | 1/1988 | Davis, Jr. et al. |
| 4,720,970 A | 1/1988 | Hudson et al. |
| 4,802,823 A | 2/1989 | Decko et al. |
| 4,819,438 A | 4/1989 | Schultz |
| 4,843,825 A | 7/1989 | Clark |
| 4,903,477 A | 2/1990 | Butt |
| 5,075,966 A | 12/1991 | Mantkowski |
| 5,181,379 A | 1/1993 | Wakeman et al. |
| 5,207,556 A | 5/1993 | Frederick et al. |
| 5,237,813 A | 8/1993 | Harris et al. |
| 5,239,818 A | 8/1993 | Stickles et al. |
| 5,274,991 A | 1/1994 | Fitts |
| 5,297,385 A | 3/1994 | Dubell et al. |
| 5,323,604 A | 6/1994 | Ekstedt et al. |
| 5,335,491 A | 8/1994 | Barbier et al. |
| 5,363,654 A * | 11/1994 | Lee .................. F28F 13/02 60/752 |
| 5,415,000 A | 5/1995 | Mumford et al. |
| 5,480,281 A | 1/1996 | Correia |
| 5,497,611 A | 3/1996 | Benz et al. |
| 5,511,375 A | 4/1996 | Joshi et al. |
| 5,628,192 A | 5/1997 | Hayes-Bradley et al. |
| 5,640,851 A | 6/1997 | Toon et al. |
| 5,749,229 A | 5/1998 | Abuaf et al. |
| 5,761,898 A | 6/1998 | Barnes et al. |
| 5,822,853 A | 10/1998 | Ritter et al. |
| 5,826,430 A | 10/1998 | Little |
| 5,836,164 A | 11/1998 | Tsukahara et al. |
| 5,839,283 A | 11/1998 | Dobbeling |
| 5,906,093 A | 5/1999 | Coslow et al. |
| 5,924,288 A | 7/1999 | Fortuna et al. |
| 5,960,632 A | 10/1999 | Abuaf et al. |
| 6,018,950 A | 2/2000 | Moeller |
| 6,041,590 A | 3/2000 | Hayton et al. |
| 6,082,111 A | 7/2000 | Stokes |
| 6,085,514 A | 7/2000 | Benim et al. |
| 6,098,397 A | 8/2000 | Glezer et al. |
| 6,109,019 A | 8/2000 | Sugishita |
| 6,116,013 A | 9/2000 | Moller |
| 6,116,018 A | 9/2000 | Tanimura et al. |
| 6,276,142 B1 | 8/2001 | Putz |
| 6,298,656 B1 | 10/2001 | Donovan et al. |
| 6,298,667 B1 | 10/2001 | Glynn et al. |
| 6,339,923 B1 | 1/2002 | Halila et al. |
| 6,345,494 B1 | 2/2002 | Coslow |
| 6,357,237 B1 | 3/2002 | Candy et al. |
| 6,374,593 B1 | 4/2002 | Ziegner |
| 6,397,581 B1 | 6/2002 | Vidal et al. |
| 6,397,602 B2 | 6/2002 | Vandervort et al. |
| 6,412,268 B1 | 7/2002 | Cromer et al. |
| 6,450,762 B1 | 9/2002 | Munshi |
| 6,456,627 B1 | 9/2002 | Frodigh et al. |
| 6,463,742 B2 | 10/2002 | Mandai et al. |
| 6,523,352 B1 | 2/2003 | Takahashi et al. |
| 6,536,216 B2 | 3/2003 | Halila et al. |
| 6,546,627 B1 | 4/2003 | Sekihara et al. |
| 6,568,187 B1 | 5/2003 | Jorgensen et al. |
| 6,607,355 B2 | 8/2003 | Cunha et al. |
| 6,619,915 B1 | 9/2003 | Jorgensen |
| 6,644,032 B1 | 11/2003 | Jorgensen et al. |
| 6,699,015 B2 | 3/2004 | Villhard |
| 6,886,622 B2 | 5/2005 | Villhard |
| 6,889,495 B2 | 5/2005 | Hayashi et al. |
| 6,921,014 B2 | 7/2005 | Hasz et al. |
| 6,951,211 B2 | 10/2005 | Bryant |
| 7,010,921 B2 | 3/2006 | Intile et al. |
| 7,056,093 B2 | 6/2006 | Self et al. |
| 7,104,069 B2 | 9/2006 | Martling et al. |
| 7,197,877 B2 | 4/2007 | Moraes |
| 7,310,938 B2 | 12/2007 | Marcum et al. |
| 7,325,402 B2 | 2/2008 | Parker et al. |
| 7,334,960 B2 | 2/2008 | Glessner et al. |
| 7,437,876 B2 | 10/2008 | Koshoffer |
| 7,493,767 B2 | 2/2009 | Bunker et al. |
| RE40,658 E | 3/2009 | Powis et al. |
| 7,665,309 B2 | 2/2010 | Parker et al. |
| 7,690,203 B2 | 4/2010 | Bland |
| 7,707,833 B1 | 5/2010 | Bland et al. |
| 7,789,125 B2 | 9/2010 | Mayer et al. |
| 7,836,703 B2 | 11/2010 | Lee et al. |
| 7,874,138 B2 | 1/2011 | Rubio et al. |
| 7,886,517 B2 | 2/2011 | Chopra et al. |
| 7,926,278 B2 | 4/2011 | Gerendas et al. |
| 8,011,188 B2 | 9/2011 | Woltmann et al. |
| 8,015,818 B2 | 9/2011 | Wilson et al. |
| 8,104,292 B2 | 1/2012 | Lee et al. |
| 8,123,489 B2 | 2/2012 | Udall et al. |
| 8,141,334 B2 | 3/2012 | Johnson et al. |
| 8,151,570 B2 | 4/2012 | Jennings et al. |
| 8,272,218 B2 | 9/2012 | Fox et al. |
| 8,281,594 B2 | 10/2012 | Wiebe |
| 8,281,595 B2 | 10/2012 | Davis, Jr. et al. |
| 8,307,657 B2 | 11/2012 | Chila |
| 8,375,726 B2 | 2/2013 | Wiebe et al. |
| 8,381,532 B2 | 2/2013 | Berry et al. |
| 8,387,391 B2 | 3/2013 | Patel et al. |
| 8,387,398 B2 | 3/2013 | Martin et al. |
| 8,393,867 B2 | 3/2013 | Chon et al. |
| 8,464,537 B2 | 6/2013 | Khan et al. |
| 8,499,566 B2 | 8/2013 | Lacy et al. |
| 8,511,086 B1 | 8/2013 | Uhm et al. |
| 8,549,857 B2 | 10/2013 | Papile |
| 8,549,861 B2 | 10/2013 | Huffman |
| 8,572,980 B2 | 11/2013 | Winkler et al. |
| 8,590,313 B2 | 11/2013 | Graves et al. |
| 8,616,002 B2 | 12/2013 | Kraemer et al. |
| 8,647,053 B2 | 2/2014 | Hsu et al. |
| 8,667,682 B2 | 3/2014 | Lee et al. |
| 8,720,205 B2 | 5/2014 | Lugg |
| 8,752,386 B2 | 6/2014 | Fox et al. |
| 8,801,428 B2 | 8/2014 | Melton et al. |
| 8,851,402 B2 | 10/2014 | Dinu et al. |
| 9,015,944 B2 | 4/2015 | Lacy et al. |
| 9,016,066 B2 | 4/2015 | Wiebe et al. |
| 9,097,184 B2 | 8/2015 | Stryapunin et al. |
| 9,121,286 B2 | 9/2015 | Dolansky et al. |
| 9,188,335 B2 | 11/2015 | Uhm et al. |
| 9,255,490 B2 | 2/2016 | Mizukami et al. |
| 9,334,808 B2 | 5/2016 | Abe et al. |
| 9,335,050 B2 | 5/2016 | Cunha et al. |
| 9,360,217 B2 | 6/2016 | DiCintio et al. |
| 9,366,437 B2 | 6/2016 | Melton et al. |
| 9,370,846 B2 | 6/2016 | Morimoto et al. |
| 9,395,085 B2 | 7/2016 | Budmir et al. |
| 9,435,539 B2 | 9/2016 | Keener et al. |
| 9,458,767 B2 | 10/2016 | Farrell |
| 9,476,592 B2 | 10/2016 | Berry |
| 9,512,781 B2 | 12/2016 | Mizukami et al. |
| 9,518,478 B2 | 12/2016 | Smith et al. |
| 9,599,343 B2 | 3/2017 | Abd El-Nabi et al. |
| 9,650,958 B2 | 5/2017 | DiCintio et al. |
| 9,759,425 B2 | 9/2017 | Westmoreland et al. |
| 9,777,581 B2 | 10/2017 | Nilsson |
| 10,087,844 B2 | 10/2018 | Hughes et al. |
| 10,161,635 B2 | 12/2018 | Pinnick et al. |
| 10,247,103 B2 | 4/2019 | Word et al. |
| 10,267,521 B2 | 4/2019 | Papple et al. |

(56) References Cited

U.S. PATENT DOCUMENTS

| | | |
|---|---|---|
| 10,520,193 B2 | 12/2019 | Berry |
| 10,520,194 B2 | 12/2019 | Berry et al. |
| 10,563,869 B2 | 2/2020 | Berry et al. |
| 2002/0043067 A1 | 4/2002 | Maeda et al. |
| 2002/0112483 A1 | 8/2002 | Kondo et al. |
| 2003/0140633 A1 | 7/2003 | Shimizu et al. |
| 2003/0156942 A1 | 8/2003 | Villhard |
| 2003/0167776 A1 | 9/2003 | Coppola |
| 2003/0192320 A1 | 10/2003 | Farmer et al. |
| 2003/0194320 A1 | 10/2003 | Villhard |
| 2004/0060295 A1 | 4/2004 | Mandai et al. |
| 2004/0123849 A1 | 7/2004 | Bryant |
| 2004/0154152 A1 | 8/2004 | Howard et al. |
| 2004/0177837 A1 | 9/2004 | Bryant |
| 2005/0000222 A1 | 1/2005 | Inoue et al. |
| 2005/0056313 A1 | 3/2005 | Hagen et al. |
| 2005/0077341 A1 | 4/2005 | Larrieu et al. |
| 2005/0223713 A1 | 10/2005 | Ziminsky et al. |
| 2006/0038326 A1 | 2/2006 | Vecchiet et al. |
| 2006/0053798 A1 | 3/2006 | Hadder |
| 2006/0070237 A1 | 4/2006 | Johnson et al. |
| 2006/0112676 A1* | 6/2006 | Cowan ............... F02K 1/822 60/266 |
| 2006/0248898 A1 | 11/2006 | Buelow et al. |
| 2007/0089419 A1 | 4/2007 | Matsumoto et al. |
| 2007/0126292 A1 | 6/2007 | Lugg |
| 2008/0006033 A1 | 1/2008 | Scarinci et al. |
| 2008/0208513 A1 | 8/2008 | Dupuy et al. |
| 2008/0276619 A1 | 11/2008 | Chopra et al. |
| 2009/0113893 A1 | 5/2009 | Li et al. |
| 2009/0223227 A1 | 9/2009 | Lipinski et al. |
| 2009/0277177 A1 | 11/2009 | Hessler |
| 2010/0058763 A1 | 3/2010 | Rubio et al. |
| 2010/0058766 A1 | 3/2010 | McMahan et al. |
| 2010/0077719 A1 | 4/2010 | Wilson et al. |
| 2010/0077752 A1 | 4/2010 | Pipile |
| 2010/0139280 A1 | 6/2010 | Lacy et al. |
| 2010/0170260 A1 | 7/2010 | Mawatari et al. |
| 2010/0186413 A1 | 7/2010 | Lacy et al. |
| 2010/0205970 A1 | 8/2010 | Hessler et al. |
| 2010/0223931 A1 | 9/2010 | Chila et al. |
| 2010/0272953 A1 | 10/2010 | Yankowich et al. |
| 2010/0287946 A1 | 11/2010 | Buelow et al. |
| 2010/0300115 A1 | 12/2010 | Morimoto et al. |
| 2011/0048030 A1 | 3/2011 | Berry et al. |
| 2011/0076628 A1 | 3/2011 | Miura et al. |
| 2011/0083439 A1 | 4/2011 | Zuo et al. |
| 2011/0179803 A1 | 7/2011 | Berry et al. |
| 2011/0209482 A1 | 9/2011 | Toqan et al. |
| 2011/0232299 A1* | 9/2011 | Stryapunin ............... F23R 3/04 60/806 |
| 2011/0247340 A1 | 10/2011 | Popovic et al. |
| 2011/0252805 A1 | 10/2011 | Berry et al. |
| 2011/0314825 A1 | 12/2011 | Stryapunin et al. |
| 2012/0023949 A1 | 2/2012 | Johnson et al. |
| 2012/0031097 A1 | 2/2012 | McMahan et al. |
| 2012/0034075 A1 | 2/2012 | Hsu et al. |
| 2012/0036858 A1 | 2/2012 | Lacy et al. |
| 2012/0114868 A1 | 5/2012 | Bunker et al. |
| 2012/0121381 A1 | 5/2012 | Charron et al. |
| 2012/0121408 A1 | 5/2012 | Lee et al. |
| 2012/0151928 A1 | 6/2012 | Patel et al. |
| 2012/0151929 A1 | 6/2012 | Patel et al. |
| 2012/0151930 A1 | 6/2012 | Patel et al. |
| 2012/0174590 A1 | 7/2012 | Krull et al. |
| 2012/0180487 A1 | 7/2012 | Uhm et al. |
| 2012/0180495 A1 | 7/2012 | Uhm et al. |
| 2012/0198854 A1 | 8/2012 | Schilp et al. |
| 2013/0084534 A1 | 4/2013 | Melton et al. |
| 2013/0086912 A1 | 4/2013 | Berry |
| 2013/0104556 A1 | 5/2013 | Uhm et al. |
| 2013/0122438 A1 | 5/2013 | Stoia et al. |
| 2013/0139511 A1 | 6/2013 | Sometani et al. |
| 2013/0165754 A1 | 7/2013 | McMahan |
| 2013/0167539 A1 | 7/2013 | Berry |
| 2013/0180691 A1 | 7/2013 | Jost et al. |
| 2013/0263571 A1 | 10/2013 | Stoia et al. |
| 2013/0294898 A1 | 11/2013 | Lee |
| 2013/0299602 A1 | 11/2013 | Hughes et al. |
| 2014/0007578 A1 | 1/2014 | Genin et al. |
| 2014/0026579 A1 | 1/2014 | Karlsson et al. |
| 2014/0033718 A1 | 2/2014 | Manoharan et al. |
| 2014/0038070 A1 | 2/2014 | Papile |
| 2014/0060063 A1 | 3/2014 | Boardman et al. |
| 2014/0109580 A1 | 4/2014 | Giri et al. |
| 2014/0144142 A1 | 5/2014 | Abd-El-Nabi et al. |
| 2014/0144152 A1 | 5/2014 | Uhm et al. |
| 2014/0150435 A1 | 6/2014 | Maurer et al. |
| 2014/0150436 A1 | 6/2014 | Eroglu et al. |
| 2014/0157779 A1 | 6/2014 | Uhm et al. |
| 2014/0186098 A1 | 7/2014 | Mironets et al. |
| 2014/0202163 A1 | 7/2014 | Johnson et al. |
| 2014/0237784 A1 | 8/2014 | Lacy et al. |
| 2014/0245738 A1 | 9/2014 | Crothers et al. |
| 2014/0250894 A1 | 9/2014 | Petty, Sr. et al. |
| 2014/0260256 A1 | 9/2014 | Loebig et al. |
| 2014/0260257 A1 | 9/2014 | Rullaud et al. |
| 2014/0260277 A1 | 9/2014 | DiCintio et al. |
| 2014/0260278 A1 | 9/2014 | Hughes |
| 2014/0260282 A1 | 9/2014 | Pinnick et al. |
| 2014/0260327 A1 | 9/2014 | Kottilingam et al. |
| 2014/0290255 A1 | 10/2014 | Akagi et al. |
| 2014/0290272 A1 | 10/2014 | Mulcaire |
| 2014/0338340 A1 | 11/2014 | Melton et al. |
| 2014/0373548 A1 | 12/2014 | Hasselqvist et al. |
| 2015/0000286 A1 | 1/2015 | LeBegue et al. |
| 2015/0020498 A1 | 1/2015 | Schilp |
| 2015/0040579 A1 | 2/2015 | Melton |
| 2015/0041590 A1 | 2/2015 | Kirtley et al. |
| 2015/0044059 A1 | 2/2015 | Wassynger et al. |
| 2015/0047361 A1 | 2/2015 | Williams et al. |
| 2015/0059348 A1 | 3/2015 | Toronto et al. |
| 2015/0059357 A1 | 3/2015 | Morgan et al. |
| 2015/0076251 A1 | 3/2015 | Berry |
| 2015/0082795 A1 | 3/2015 | Fadde et al. |
| 2015/0082796 A1 | 3/2015 | Andersson et al. |
| 2015/0135716 A1 | 3/2015 | Ginessin et al. |
| 2015/0096305 A1 | 4/2015 | Morgan et al. |
| 2015/0107262 A1 | 4/2015 | Maurer |
| 2015/0111060 A1 | 4/2015 | Kottilingam et al. |
| 2015/0135718 A1 | 5/2015 | Hughes et al. |
| 2015/0165568 A1 | 6/2015 | Means et al. |
| 2015/0167983 A1 | 6/2015 | McConnaughhay et al. |
| 2015/0219336 A1 | 8/2015 | Crothers et al. |
| 2015/0369068 A1 | 12/2015 | Kottilingam |
| 2015/0375321 A1 | 12/2015 | Cui et al. |
| 2016/0033132 A1 | 2/2016 | Venkatesan et al. |
| 2016/0061453 A1 | 3/2016 | Bethke |
| 2016/0146460 A1 | 5/2016 | Stewart et al. |
| 2016/0146469 A1 | 5/2016 | Lum et al. |
| 2016/0178202 A1 | 6/2016 | Antoniono et al. |
| 2016/0215980 A1 | 7/2016 | Chang |
| 2016/0223201 A1 | 8/2016 | Zink |
| 2016/0369068 A1 | 12/2016 | Reilly, Jr. et al. |
| 2017/0038074 A1 | 2/2017 | Myers et al. |
| 2017/0122562 A1 | 5/2017 | Berry |
| 2017/0138595 A1 | 5/2017 | Berry et al. |
| 2017/0176014 A1 | 6/2017 | Hughes et al. |
| 2017/0203365 A1 | 7/2017 | Pays et al. |
| 2017/0219211 A1 | 8/2017 | Kajimura et al. |
| 2017/0232683 A1 | 8/2017 | Alcantara Marte et al. |
| 2017/0248318 A1 | 8/2017 | Kulkarni |
| 2017/0254539 A1 | 9/2017 | Melton et al. |
| 2017/0260997 A1 | 9/2017 | Mola et al. |
| 2017/0261209 A9 | 9/2017 | Ginessin et al. |
| 2017/0276357 A1 | 9/2017 | Berry et al. |
| 2017/0276358 A1 | 9/2017 | Berry et al. |
| 2017/0276359 A1 | 9/2017 | Berry et al. |
| 2017/0276360 A1 | 9/2017 | Berry et al. |
| 2017/0276361 A1 | 9/2017 | Berry et al. |
| 2017/0276362 A1 | 9/2017 | Berry et al. |
| 2017/0276363 A1 | 9/2017 | Berry et al. |
| 2017/0276364 A1 | 9/2017 | Berry et al. |
| 2017/0276365 A1 | 9/2017 | Berry et al. |

(56) References Cited

U.S. PATENT DOCUMENTS

| | | |
|---|---|---|
| 2017/0276366 A1 | 9/2017 | Berry et al. |
| 2017/0276369 A1 | 9/2017 | Berry et al. |
| 2017/0279357 A1 | 9/2017 | Berry et al. |
| 2017/0298827 A1 | 10/2017 | Berry et al. |
| 2017/0299185 A1 | 10/2017 | Berry et al. |
| 2017/0299186 A1 | 10/2017 | Berry et al. |
| 2017/0299187 A1 | 10/2017 | Berry et al. |
| 2017/0363293 A1 | 12/2017 | Grooms et al. |
| 2018/0016917 A1* | 1/2018 | Tallman .............. F01D 5/186 |
| 2018/0149364 A1 | 5/2018 | Berry |
| 2018/0172276 A1 | 6/2018 | Bailey et al. |
| 2018/0187603 A1 | 7/2018 | Berry |
| 2018/0319077 A1 | 11/2018 | Blanchet et al. |
| 2018/0328187 A1 | 11/2018 | Oke |
| 2019/0056112 A1 | 2/2019 | Natarajan et al. |
| 2019/0154345 A1 | 5/2019 | Martinez et al. |
| 2019/0383488 A1* | 12/2019 | Berry .............. F01D 11/005 |
| 2020/0254519 A1 | 8/2020 | Jones et al. |

FOREIGN PATENT DOCUMENTS

| | | |
|---|---|---|
| EP | 1146289 A1 | 10/2001 |
| EP | 2369235 A2 | 9/2011 |
| EP | 2378201 A2 | 10/2011 |
| EP | 2551597 A2 | 1/2013 |
| EP | 2573325 A1 | 3/2013 |
| EP | 2613002 A2 | 7/2013 |
| EP | 2666613 A1 | 11/2013 |
| EP | 2672182 A2 | 12/2013 |
| EP | 2685172 A1 | 1/2014 |
| EP | 2716396 A1 | 4/2014 |
| EP | 2716868 A2 | 4/2014 |
| EP | 2722509 A1 | 4/2014 |
| EP | 2762784 A1 | 8/2014 |
| EP | 2863018 A1 | 4/2015 |
| EP | 2905538 A1 | 8/2015 |
| JP | H0941991 A | 2/1997 |
| JP | 3774491 B2 | 5/2006 |
| JP | 2011/058775 A | 3/2011 |
| WO | WO99/61841 A1 | 12/1999 |
| WO | WO1999/064791 A1 | 12/1999 |
| WO | WO2004/035187 A2 | 4/2004 |
| WO | WO2005/024204 A1 | 3/2006 |
| WO | WO2007/035298 A2 | 3/2007 |
| WO | WO2008/076947 A2 | 6/2008 |
| WO | WO2011/130001 A2 | 10/2011 |
| WO | WO2014/191495 A1 | 12/2014 |
| WO | WO2015/057288 A1 | 4/2015 |

OTHER PUBLICATIONS

European Office Action Corresponding to Application No. 21179914 dated Dec. 7, 2021.

* cited by examiner

IMPINGEMENT PANEL SUPPORT STRUCTURE AND METHOD OF MANUFACTURE

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD

The present disclosure relates generally to an integrated combustion nozzle for a gas turbine engine. More specifically, this disclosure relates to various cooling components for an integrated combustion nozzle.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In many turbomachine combustors, combustion gases are routed towards an inlet of a turbine section of the gas turbine through a hot gas path that is at least partially defined by a combustion liner that extends downstream from a fuel nozzle and terminates at the inlet to the turbine section. Accordingly, high combustion gas temperatures within the turbine section generally corresponds to greater thermal and kinetic energy transfer between the combustion gases and the turbine, thereby enhancing overall power output of the turbomachine. However, the high combustion gas temperatures may lead to erosion, creep, and/or low cycle fatigue to the various components of the combustor, thereby limiting its overall durability.

Thus, it is necessary to cool the components of the combustor, which is typically achieved by routing a cooling medium, such as the compressed working fluid from the compressor section, to various portions of the combustion liner. However, utilizing a large portion of compressed working fluid from the compressor section may negatively impact the overall operating efficiency of the turbomachine because it decreases the amount of working fluid that is utilized in the turbine section. Accordingly, an improved system for cooling a turbomachine combustor is desired in the art. In particular, a system that efficiently utilizes compressed working fluid from the compressor would be useful.

BRIEF DESCRIPTION

Aspects and advantages of the assemblies and methods in accordance with the present disclosure will be set forth in part in the following description, or may be obvious from the description, or may be learned through practice of the technology.

In accordance with one embodiment, an impingement panel is provided. The impingement panel configured to provide impingement cooling to an exterior surface. The impingement panel has an impingement plate disposed along the exterior surface. The impingement plate defines a plurality of impingement apertures that direct coolant in discrete jets towards the exterior surface. The impingement panel includes an inlet portion that extends from the impingement plate to a collection duct. At least one support coupled to the impingement plate and at least one of the inlet portion and the collection duct.

In accordance with another embodiment, an integrated combustor nozzle is provided. The integrated combustor nozzle includes a combustion liner that extends radially between an inner liner segment and an outer liner segment. The combustion liner including a forward end portion, an aft end portion, a first side wall, and a second side wall. The aft end portion of the combustion liner defines a turbine nozzle. The integrated combustor nozzle further includes an impingement panel. The impingement panel has an impingement plate disposed along an exterior surface of one of the inner liner segment or the outer liner segment. The impingement plate defines a plurality of impingement apertures that direct coolant in discrete jets towards the exterior surface of the one of the inner liner segment or the outer liner segment. The impingement panel includes an inlet portion that extends from the impingement plate to a collection duct. At least one support coupled to the impingement plate and at least one of the inlet portion and the collection duct.

In accordance with yet another embodiment, a method for fabricating an impingement panel is provided. The method includes a step of irradiating a layer of powder in a powder bed to form a fused region. The powder bed is disposed on a build plate. The method further includes a step of providing a subsequent layer of powder over the powder bed by passing a recoater arm over the powder bed from a first side of the powder bed. The method further includes repeating the irradiating and providing steps until the impingement panel is formed on the build plate. The impingement panel includes an impingement plate that defines a plurality of impingement apertures. The impingement panel further includes an inlet portion that extends from the impingement plate to a collection duct. At least one support coupled to the impingement plate and at least one of the inlet portion and the collection duct.

These and other features, aspects and advantages of the present assemblies and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present assemblies, including the best mode of making and using the present systems and methods, directed to one of ordinary skill in the art, is set forth in the specification, which makes reference to the appended figures, in which.

DETAILED DESCRIPTION

Figure 1:
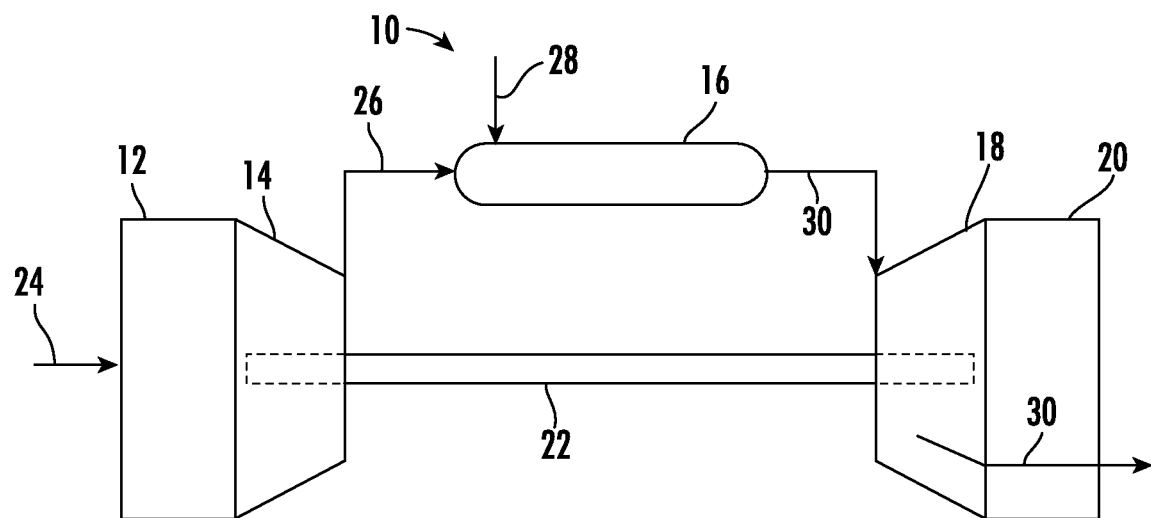
FIG. 1 is a schematic illustration of a turbomachine, in accordance with embodiments of the present disclosure.

Reference now will be made in detail to embodiments of the present assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

Figure 2:
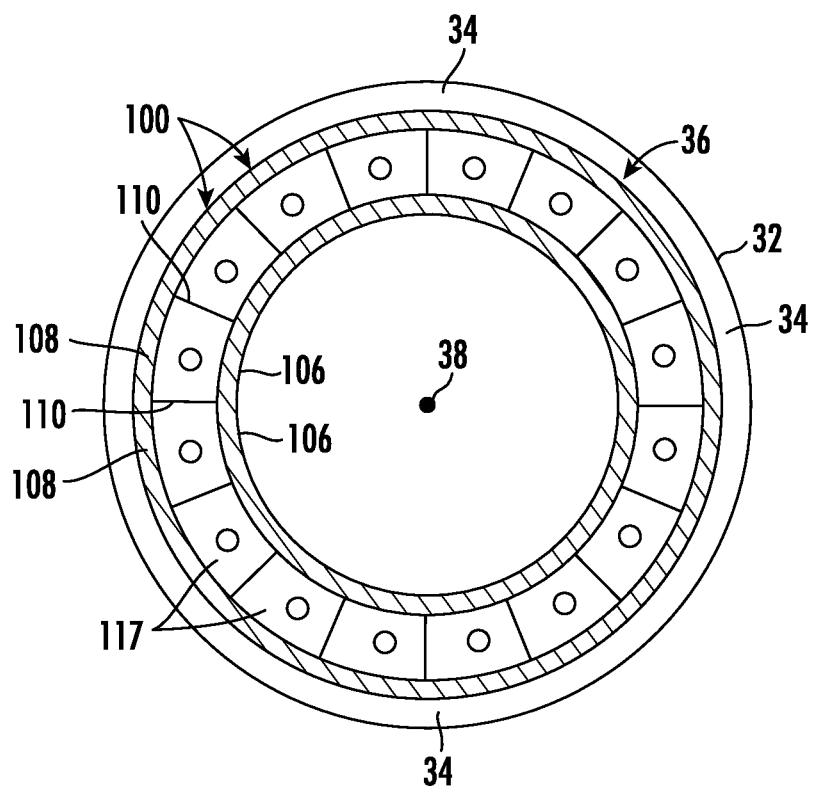
FIG. 2 is an upstream view of an exemplary combustion section of a turbomachine, in accordance with embodiments of the present disclosure.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. In various embodiments, as shown in FIG. 2, the combustion section 16 includes a segmented annular combustion system 36 that includes a number of integrated combustor nozzles 100 arranged circumferentially around an axial centerline 38 of the gas turbine 10, which may be coincident with the gas turbine shaft 22.

Figure 3:
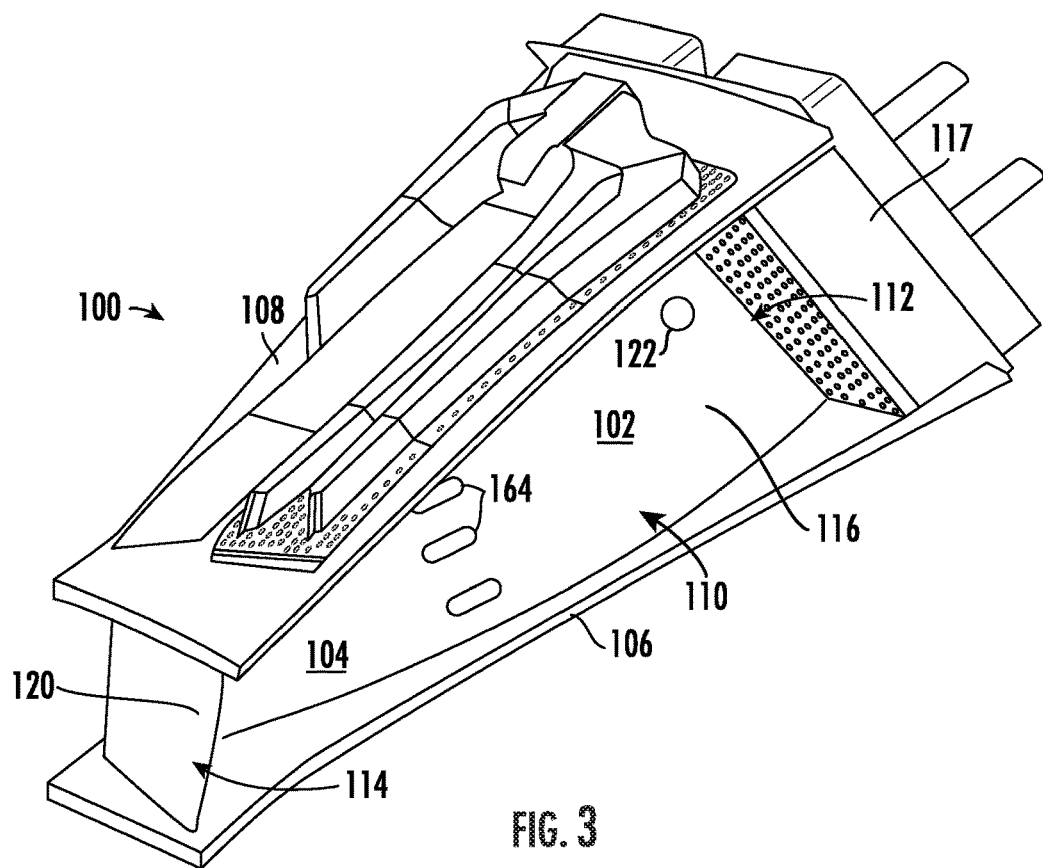
FIG. 3 is a perspective view of an integrated combustor nozzle, as viewed from a first side, in accordance with embodiments of the present disclosure.
Figure 4:
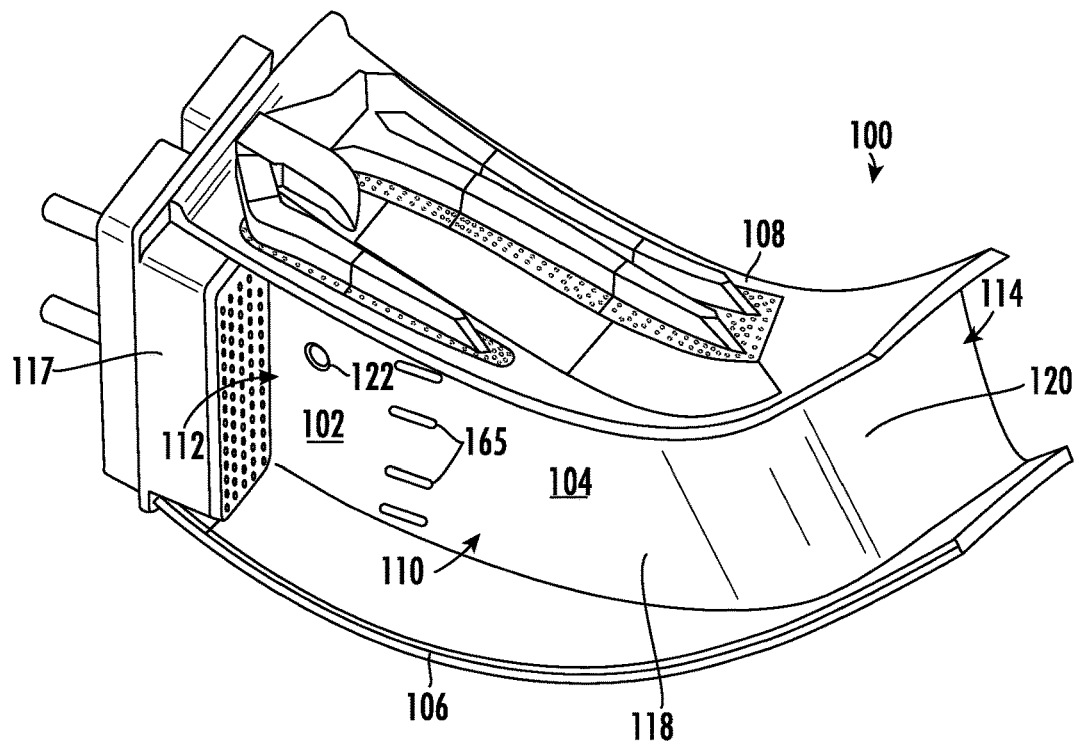
FIG. 4 is a perspective view of an integrated combustor nozzle, as viewed from a second side, in accordance with embodiments of the present disclosure.

FIG. 3 provides a perspective view of an integrated combustor nozzle 100, as viewed from a first side. Similarly, FIG. 4 provides a perspective view of an integrated combustor nozzle 100, as viewed from a second side, in accordance with embodiments of the present disclosure. As shown collectively in FIGS. 2, 3 and 4, the segmented annular combustion system 36 includes a plurality of integrated combustor nozzles 100. As described further herein, each combustor nozzle 100 includes a first side wall 116 and a second side wall 118. In particular embodiments, the first side wall is a pressure side wall, while the second side wall is a suction side wall, based on the integration of the side walls with corresponding pressure and suction sides of a downstream turbine nozzle 120. It should be understood that any references made herein to pressure side walls and suction side walls are representative of particular embodiments, such references being made to facilitate discussion, and that such references are not intended to limit the scope of any embodiment, unless specific context dictates otherwise.

As shown collectively in FIGS. 3 and 4, each circumferentially adjacent pair of combustor nozzles 100 defines a respective primary combustion zone 102 and a respective secondary combustion zone 104 therebetween, thereby forming an annular array of primary combustion zones 102 and secondary combustion zones 104. The primary combustion zones 102 and the secondary combustion zones 104 are circumferentially separated, or fluidly isolated, from adjacent primary combustion zones 102 and secondary combustion zones 104, respectively, by the combustion liners 110.

As shown collectively in FIGS. 3 and 4, each combustor nozzle 100 includes an inner liner segment 106, an outer liner segment 108, and a hollow or semi-hollow combustion liner 110 that extends between the inner liner segment 106 and the outer liner segment 108. It is contemplated that more than one (e.g., 2, 3, 4, or more) combustion liners 110 may be positioned between the inner liner segment 106 and the outer liner segment 108, thereby reducing the number of joints between adjacent liner segments that require sealing. For ease of discussion herein, reference will be made to integrated combustor nozzles 100 having a single combustion liner 110 between respective inner and outer liner segments 106, 108, although a 2:1 ratio of liner segments to combustion liners is not required. As shown in FIGS. 3 and 4, each combustion liner 110 includes forward or upstream end portion 112, an aft or downstream end portion 114, a first side wall 116, which is a pressure side wall in the particular example embodiment illustrated in FIG. 3 and a second side wall 118, which is a suction side wall in the particular example embodiment illustrated in FIG. 4.

The segmented annular combustion system 36 further includes a fuel injection module 117. In the illustrated example embodiment, the fuel injection module 117 includes a plurality of fuel nozzles. The fuel injection module 117 is configured for installation in the forward end portion 112 of a respective combustion liner 110. For purposes of illustration herein, the fuel injection module 117 including the plurality of fuel nozzles may be referred to as a "bundled tube fuel nozzle." However, the fuel injection module 117 may include or comprise any type of fuel nozzle or burner (such as a swirling fuel nozzle or swozzle), and the claims should be not limited to a bundled tube fuel nozzle unless specifically recited as such.

Each fuel injection module 117 may extend at least partially circumferentially between two circumferentially adjacent combustion liners 110 and/or at least partially radially between a respective inner liner segment 106 and outer liner segment 108 of the respective combustor nozzle 100. During axially staged fuel injection operation, the fuel injection module 117 provides a stream of premixed fuel and air (that is, a first combustible mixture) to the respective primary combustion zone 102.

In at least one embodiment, as shown in FIGS. 3 and 4, the downstream end portion 114 of one or more of the combustion liners 110 transitions into a generally airfoil-shaped turbine nozzle 120, which directs and accelerates the flow of combustion products toward the turbine blades. Thus, the downstream end portion 114 of each combustion liner 110 may be considered an airfoil without a leading edge. When the integrated combustor nozzles 100 are mounted within the combustion section 16, the turbine nozzle 120 may be positioned immediately upstream from a stage of turbine rotor blades of the turbine 18.

As used herein, the term "integrated combustor nozzle" refers to a seamless structure that includes the combustion liner 110, the turbine nozzle 120 downstream of the combustion liner, the inner liner segment 106 extending from the forward end 112 of the combustion liner 110 to the aft end 114 (embodied by the turbine nozzle 120), and the outer liner segment 108 extending from the forward end 112 of the combustion liner 110 to the aft end 114 (embodied by the turbine nozzle 120). In at least one embodiment, the turbine nozzle 120 of the integrated combustor nozzle 100 functions as a first-stage turbine nozzle and is positioned upstream from a first stage of turbine rotor blades.

As described above, one or more of the integrated combustor nozzles 100 is formed as an integral, or unitary, structure or body that includes the inner liner segment 106, the outer liner segment 108, the combustion liner 110, and the turbine nozzle 120. The integrated combustor nozzle 100 may be made as an integrated or seamless component, via casting, additive manufacturing (such as 3D printing), or other manufacturing techniques. By forming the combustor nozzle 100 as a unitary or integrated component, the need for seals between the various features of the combustor nozzle 100 may be reduced or eliminated, part count and costs may be reduced, and assembly steps may be simplified or eliminated. In other embodiments, the combustor nozzle 100 may be fabricated, such as by welding, or may be formed from different manufacturing techniques, where components made with one technique are joined to components made by the same or another technique.

In particular embodiments, at least a portion or all of each integrated combustor nozzle 100 may be formed from a ceramic matrix composite (CMC) or other composite material. In other embodiments, a portion or all of each integrated combustor nozzle 100 and, more specifically, the turbine nozzle 120 or its trailing edge, may be made from a material that is highly resistant to oxidation (e.g., coated with a thermal barrier coating) or may be coated with a material that is highly resistant to oxidation.

In another embodiment (not shown), at least one of the combustion liners 110 may taper to a trailing edge that is aligned with a longitudinal (axial) axis of the combustion liner 110. That is, the combustion liner 110 may not be integrated with a turbine nozzle 120. In these embodiments, it may be desirable to have an uneven count of combustion liners 110 and turbine nozzles 120. The tapered combustion liners 110 (i.e., those without integrated turbine nozzles 120) may be used in an alternating or some other pattern with combustion liners 110 having integrated turbine nozzles 120 (i.e., integrated combustor nozzles 100).

At least one of the combustion liners 110 may include at least one cross-fire tube 122 that extends through respective openings in the pressure side wall 116 and the suction side wall 118 of the respective combustion liner 110. The cross-fire tube 122 permits cross-fire and ignition of circumferentially adjacent primary combustion zones 102 between circumferentially adjacent integrated combustor nozzles 100.

Figure 6:
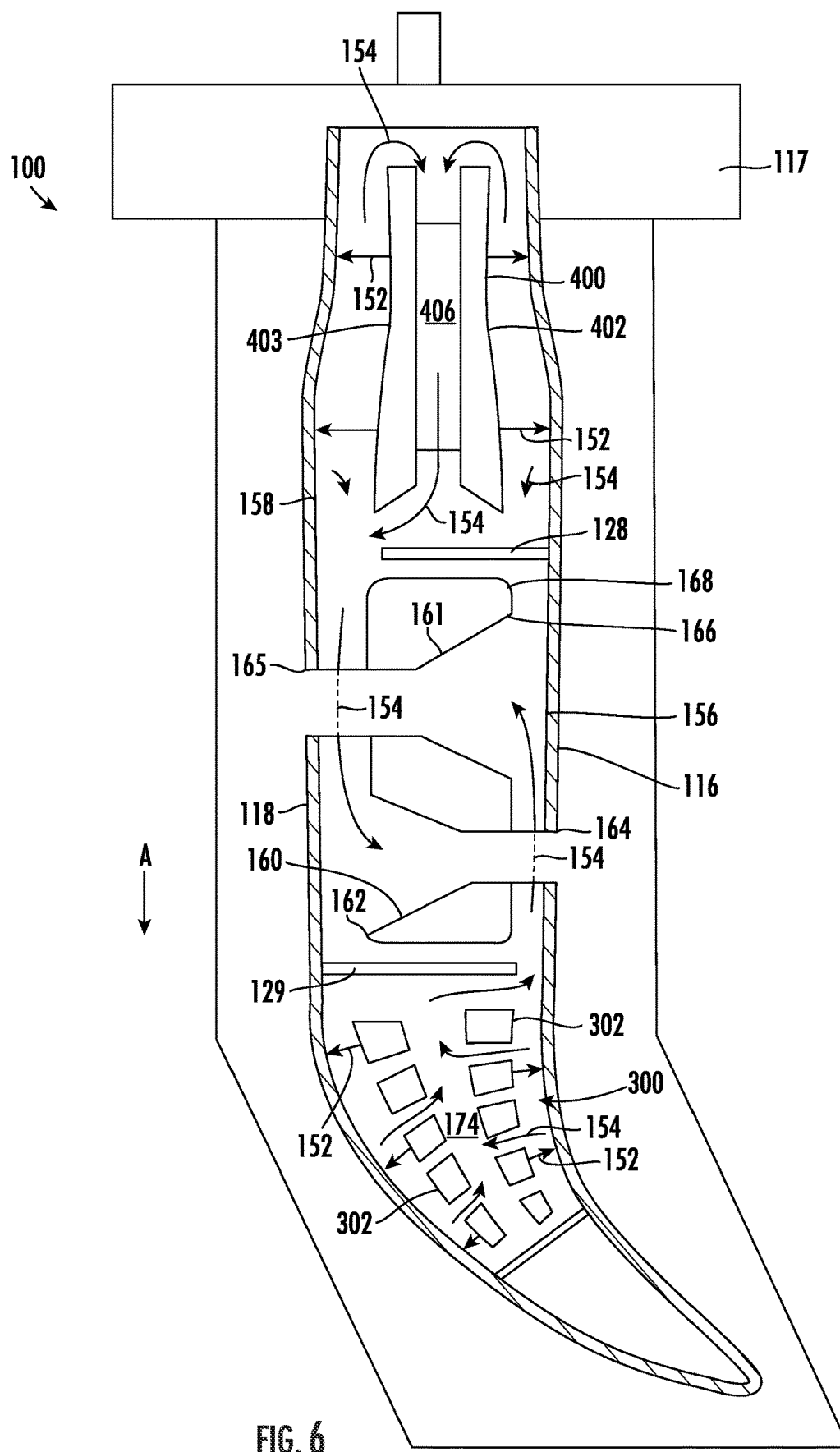
FIG. 6 is a cross-sectional schematic view of an integrated combustor nozzle from along a radial direction of the turbomachine, in accordance with embodiments of the present disclosure.

In many embodiments, as shown in FIG. 3, each combustion liner 110 may include a plurality of radially spaced pressure side injection outlets 164 defined along the pressure side wall 116, through which the pressure side fuel injectors 160 may extend (FIG. 6). As shown in FIG. 4, each combustion liner 110 may include a plurality of radially spaced suction side injection outlets 165 defined along the suction side wall 118, through which the suction side fuel injectors 161 may extend (FIG. 6). Each respective primary combustion zone 102 is defined upstream from the corresponding pressure side injection outlets 164 and/or suction side injection outlets 165 of a pair of circumferentially adjacent integrated combustor nozzles 100. Each secondary combustion zone 104 is defined downstream from the corresponding pressure side injection outlets 164 and/or suction side injection outlets 165 of the pair of circumferentially adjacent integrated combustor nozzles 100. Although the plurality of pressure side injection outlets 164 are shown in FIG. 2 as residing in a common radial or injection plane with respect to an axial centerline of the integrated combustor nozzle 100 or at a common axial distance from the downstream end portion 114 of the fuel injection panel 110, in particular embodiments, one or more of the pressure side injection outlets 164 may be staggered axially with respect to radially adjacent pressure side injection outlets 164, thereby off-setting the axial distances of the pressure side injection outlets 164 to the downstream end portion 114 for particular pressure side injection outlets 164. Similarly, although FIG. 4 illustrates the plurality of suction side injection outlets 165 in a common radial or injection plane or at a common axial distance from the downstream end portion 114 of the fuel injection panel 110, in particular embodiments, one or more of the suction side injection outlets 165 may be staggered axially with respect to radially adjacent suction side injection outlets 165, thereby off-setting the axial distances of the pressure side injection outlets 165 to the downstream end portion 114 for particular suction side injection outlets 165.

During operation of the segmented annular combustion system 36, it may be necessary to cool one or more of the pressure side walls 116, the suction side walls 118, the turbine nozzle 120, the inner liner segments 106, and/or the outer liner segments 108 of each integrated combustor nozzle 100 in order to enhance mechanical performance of each integrated combustor nozzle 100 and of the segmented annular combustion system 36 overall. In order to accommodate cooling requirements, each integrated combustor nozzle 100 may include various air passages or cavities, and the various air passages or cavities may be in fluid communication with the high pressure plenum 34 formed within the compressor discharge casing 32 and/or with the premix air plenum 144 defined within each combustion liner 110.

Figure 5:
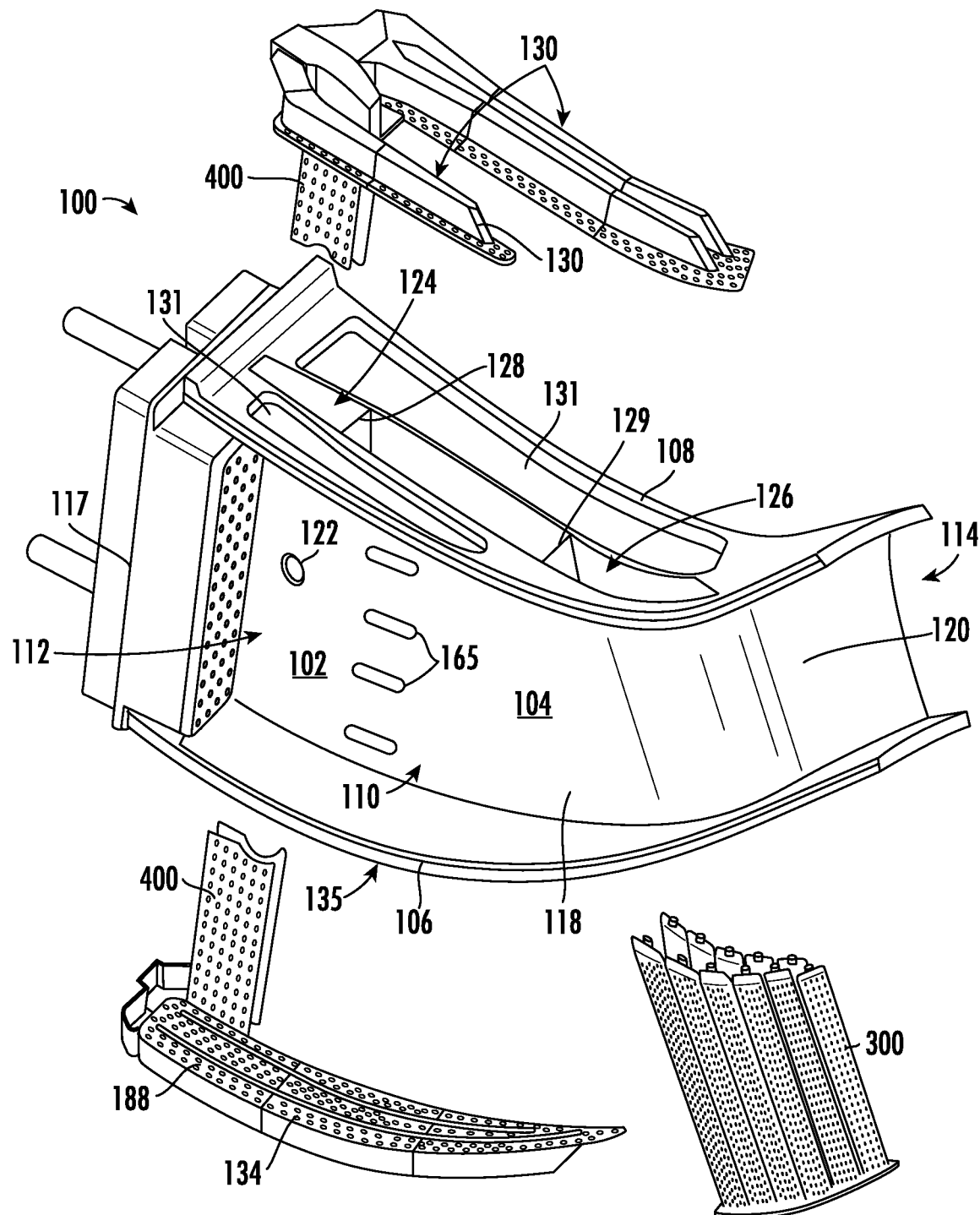
FIG. 5 is a perspective view of an integrated combustor nozzle, which is shown having various cooling components exploded away, in accordance with embodiments of the present disclosure.

FIG. 5 illustrates a perspective view of an integrated combustor nozzle 100, which is shown having various cooling components exploded away, in accordance with embodiments of the present disclosure. In various embodiments, as shown, an interior portion of each combustion liner 110 may be defined between the pressure side wall 116 and the suction side wall 118 and may be partitioned into various air passages or cavities 124, 126 by one or more ribs 128, 129. In particular embodiments, the air cavities 124, 126 may receive air from the compressor discharge casing 32 or other cooling source. The ribs or partitions 128, 129 may extend within the interior portion of the combustion liner 110 to at least partially form or separate the plurality of air cavities 124, 126. In particular embodiments, some or all of the ribs 128, 129 may provide structural support to the pressure side wall 116 and/or the suction side wall 118 of the combustion liner 110.

Figure 7:
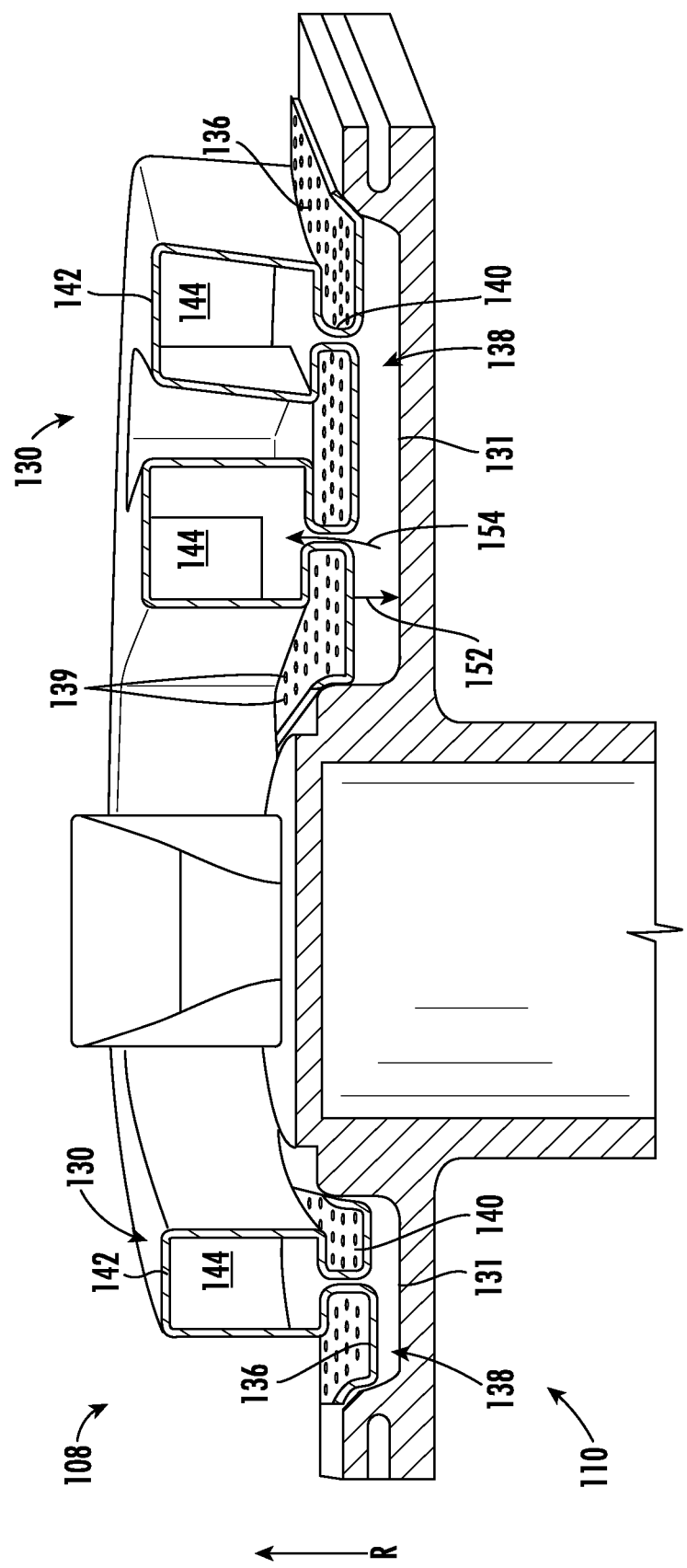
FIG. 7 is an enlarged cross-sectional view of a portion of an outer liner segment of an integrated combustor nozzle, in accordance with embodiments of the present disclosure.

In particular embodiments, as shown in FIG. 5, each integrated combustor nozzle 100 may include one or more outer impingement panels 130 that extends along an exterior surface 131 of the outer liner segment 108. The outer impingement panels 130 may have a shape corresponding to the shape, or a portion of the shape, of the outer liner segment 108. In many embodiments, the outer impingement panel 130 may define a plurality of impingement holes 139 defined at various locations along the outer impingement panel 130 (FIG. 7). In many embodiments, as shown best in FIGS. 3 and 4, the outer impingement panels 130 may be disposed both sides of the cavities 124, 126, in order to provide impingement cooling to the entire outer liner segment 108.

Similarly, each integrated combustor nozzle 100 may include an inner impingement panel 134 that extends along an exterior surface 135 of the inner liner segment 106. The inner impingement panel 134 may have a shape corresponding to the shape, or a portion of the shape, of the inner liner segment 106. In many embodiments, as shown best in FIGS. 3 and 4, the inner impingement panel 134 may be disposed on both sides of the cavities 124, 126, in order to provide impingement cooling to the entire inner liner segment 106.

As shown in FIG. 5, one or more of the integrated combustor nozzles 100 may further include cooling inserts 400 that are positioned proximate the forward end 112 of the combustion liner 110 and an impingement cooling apparatus 300 that is positioned proximate the aft end 114 of the combustion liner 110. As shown and described in detail below, the cooling inserts may be positioned within the cavity 124, such that the cooling inserts 400 are housed within the interior of the combustion liner 110 to provide cooling thereto. Similarly, the impingement cooling apparatus 300 may be housed within the cavity 126, such that the impingement cooling apparatus 300 is housed within the interior of the combustion liner 110 to provide cooling thereto. As described in more detail below, both the cooling inserts 400 and the impingement cooling apparatus 300 may be formed as a substantially hollow (or semi-hollow) structure, with an opening at one or both ends, in a shape complementary to the air cavity 126. During operation, air from the compressor discharge casing 32 may flow through one or both of the cooling inserts 400 and/or the impingement cooling apparatus 300, where the air may flow through impingement holes as discrete jets, which impinge on interior surfaces of the combustion liner 110 thereby allowing heat to transfer convectively from the interior surfaces of the combustion liner 110 to the cooling air. As discussed in detail below, after impinging on the interior surfaces of the combustion liner 110, a portion of the air passed through the cooling insets 400 and/or the impingement cooling apparatus 300 may be flowed through the combustion liner 110 towards the fuel injectors where the air may be mixed with fuel and used for combustion in the secondary combustion zone 104. In this way, the air that is used for cooling the combustion liner 110 is also used to produce work in the turbine section 18, thereby increasing the overall efficiency of the gas turbine 10.

In many embodiments, as shown, two cooling inserts 400 may be installed within the air cavity 124, such as a first cooling insert 400 installed through the inner liner segment 106 and a second cooling insert 400 installed through the outer liner segment 108. Such an assembly may be useful when the integrated combustor nozzle 100 includes a cross-fire tube 122 that prevents insertion of a single impingement air insert 400 through the radial dimension of the cavity 124. Alternately, two or more impingement air inserts 400 may be positioned sequentially in the axial direction A (the axial direction A is indicated, e.g., in FIG. 6) within a given cavity, e.g., on either side of the cross-fire tube 122.

FIG. 6 illustrates a cross-sectional schematic view of an integrated combustor nozzle 100, in accordance with embodiments of the present disclosure. As shown in FIG. 6, the integrated combustor nozzle 100 may further include a pressure side fuel injector 160. In many embodiments, the integrated combustor nozzle 100 may include a plurality of pressure side fuel injectors 160 spaced apart from one another along the radial direction R. For example, each of the pressure side fuel injectors 160 may extend from an inlet 162 positioned within the combustion liner 110 proximate the suction side wall 118 to the pressure side injection outlet 164. Similarly, in many embodiments, the integrated combustor nozzle 100 may include a plurality of suction side fuel injectors 161 spaced apart from one another along the radial direction R. For example, each of the suction side fuel injectors 161 may extend from an inlet 166 positioned within the combustion liner 110 proximate the pressure side wall 116 to the suction side injection outlet 165. The fuel injectors 160, 161 may provide a secondary mixture of fuel and air to the secondary combustion zone 104 downstream from the primary combustion zone 102, in order to increase the temperature of the combustion gases before they enter the turbine section 18 and are used to produce work.

In various embodiments, as shown in FIG. 6, the fuel injectors 160, 161 may be positioned axially between the cooling insert(s) 400 and the impingement cooling apparatus 300. In particular embodiments, the pressure side fuel injector 160 may be positioned axially between the impingement cooling apparatus 300 and the suction side fuel injector 161. Likewise, the suction side fuel injector 161 may be positioned axially between the cooling insert(s) 400 and the pressure side fuel injector 160.

In particular embodiments, the integrated combustor nozzle 100 may include a frame 168 and ribs 128, 129. The frame 168 may extend around and support the fuel injectors 160, 161. Further, the frame 168 may at least partially define a path for air to travel before entering the fuel injectors 160, 161. Each of the ribs 128, 129 may extend between the pressure side wall 116 and the suction side wall 118. As shown in FIG. 6, the ribs 128, 129 may include one or more openings defined therethrough in order to provide for fluid communication between the fuel injectors 160, 161 and the cooling insert 400 or the impingement cooling apparatus 300.

Figure 17:
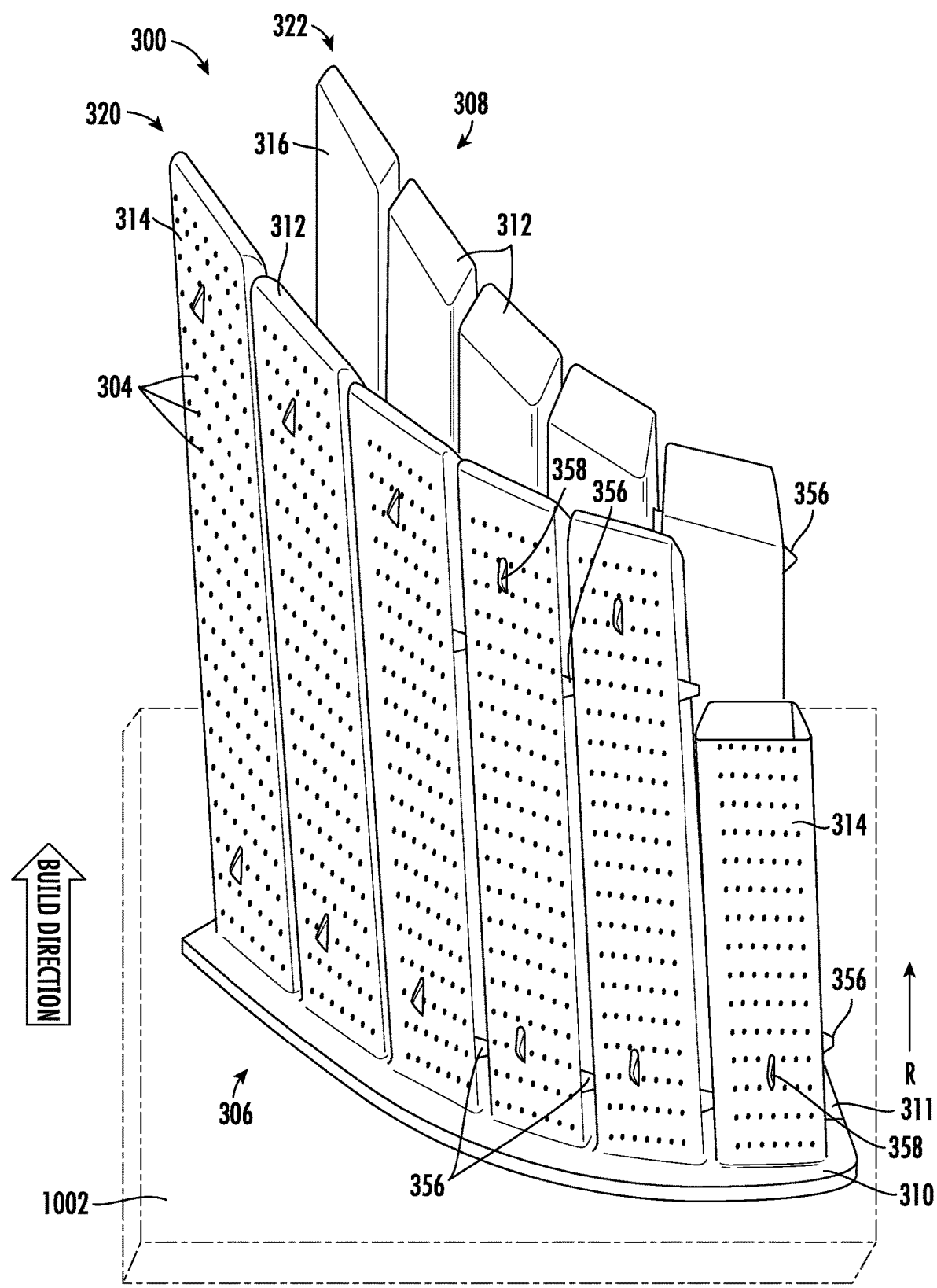
FIG. 17 is a perspective view of the impingement cooling apparatus, which is isolated from the integrated combustor nozzle and positioned on a build plate, and in which one of the impingement members in a row has been cut away, in accordance with embodiments of the present disclosure.

As shown, the various arrows illustrate the flow path of air within the combustion liner 110. For example, the integrated combustor nozzle 100 may further include pre-impingement air 152 and post-impingement air or spent cooling air 154. As shown in FIG. 6, the pre-impingement air 152 may exit the cooling insert 400 via a first plurality of impingement apertures 404 (FIG. 24) and a second plurality of impingement apertures 405 (FIG. 25) defined on each of the walls 402, 403, respectively. Similarly, pre-impingement air 152 may exit the impingement cooling apparatus 300 via a plurality of impingement apertures 304 defined on each of the impingement members 302 (FIG. 17). The impingement apertures 304, 404, 405 may be sized and oriented to direct the pre-impingement air 152 in discrete jets to impinge upon the interior surface 156 of the pressure side wall 116 or the interior surface 158 of the suction side wall 118. The discrete jets of air impinge (or strike) the interior surface 156,158 and create a thin boundary layer of air over the interior surface 156, 158, which allows for optimal heat transfer between the walls 116, 118 and the air. For example, the impingement apertures 304, 404, 405 may orient pre-impingement air such that it is perpendicular to the surface upon which it strikes, e.g. the interior surface 156, 158 of the walls 116, 118. Once the air has impinged upon the interior surface 156, 158, it may be referred to as "post-impingement air" and/or "spent cooling air" because the air has undergone an energy transfer and therefore has different characteristics. For example, the spent cooling air 154 may have a higher temperature and lower pressure than the pre-impingement air 152 because the spent cooling air 154 has removed heat from the combustion liner 110 during the impingement process.

Referring to the flow path of air exiting the impingement cooling apparatus 300, as shown in FIG. 6, pre-impingement air 152 exits each of the impingement members 302 via the plurality of impingement apertures 304 and impinges upon the interior surfaces 156, 158 of the side walls 116, 118. At which point, the air undergoes an energy transfer by removing heat from the side walls 116, 118 and thus becoming post-impingement air 154. The post-impingement air 154 then reverses directions and flows through gaps 172 (FIG. 18) defined between the impingement members 302. As shown in FIG. 6, the impingement cooling apparatus 300 may further define a collection passageway 174 that receives post-impingement air 154 from the gaps 172 defined between the impingement members 302. Both the gaps 172 and the collection passageway 174 favorably provide a path for the post-impingement air 154 to travel away from the pre-impingement air 152. This is advantageous because it prevents the post-impingement air 154 from impeding, i.e. flowing across and disrupting, the flow of pre-impingement air 152, which allows the pre-impingement air 152 to maintain its high velocity and cool the walls 116, 118 effectively. Once the post-impingement air 154 is within the collection passageway 174, it may flow in a direction generally opposite to the axial direction A, i.e. opposite the direction of combustion gases. As shown in FIG. 6, the post-impingement air 154 may flow from the collection passageway 174, through the one or more holes defined in the rib 129, around the pressure side fuel injector 160, and into the inlet 166 of the suction side fuel injector 161. In this way, all of the air that flows through impingement cooling apparatus 300 is utilized for both impingement cooling and combustion gas generation, which minimizes the amount of wasted air from the compressor section 14 and therefore increases the overall performance of the gas turbine 10.

Referring now to the flow path of air exiting the cooling insert 400, as shown in FIG. 6, pre-impingement air 152 may exit the walls 402, 403 via the plurality of impingement apertures 404, 405 and impinge upon the interior surfaces 156, 158 of the side walls 116, 118. At which point, the air undergoes an energy transfer by removing heat from the side walls 116, 118 and thus becoming post-impingement air 154. Then a portion post-impingement air 154 then changes directions and flows in a direction opposite to the axial direction A, i.e., opposite the direction of combustion gases. As shown in FIG. 6, the post-impingement air 154 may then reverse directions and travel through a collection passageway 406, that is defined between the walls 402, 403. The collection passageway 406 may direct the post impingement air 154 towards the pressure side fuel injector 160. In this way, the collection passageway 406 favorably provides a path for the post-impingement air 154 to travel that is away from the pre-impingement air 152. This is advantageous because it prevents the post-impingement air 154 from impeding, i.e., flowing across and disrupting, the flow of pre-impingement air 152, which allows the pre-impingement air 152 to maintain its high velocity and cool the walls 116, 118 effectively. Once the post-impingement air 154 is within the collection passageway 406, it may be guided towards the inlet 162 of the pressure side fuel injector 160. For example, the post-impingement air 154 may flow from the collection passageway 406, through the one or more openings defined in the rib 128, around the suction side fuel injector 161, and into the inlet 162 of the pressure side fuel injector 160. In this way, all of the air that flows through the cooling insert 400 is utilized for both impingement cooling and combustion gas generation, which minimizes the amount of wasted air from the compressor section 14 and therefore increases the overall performance of the gas turbine 10.

Figure 8:
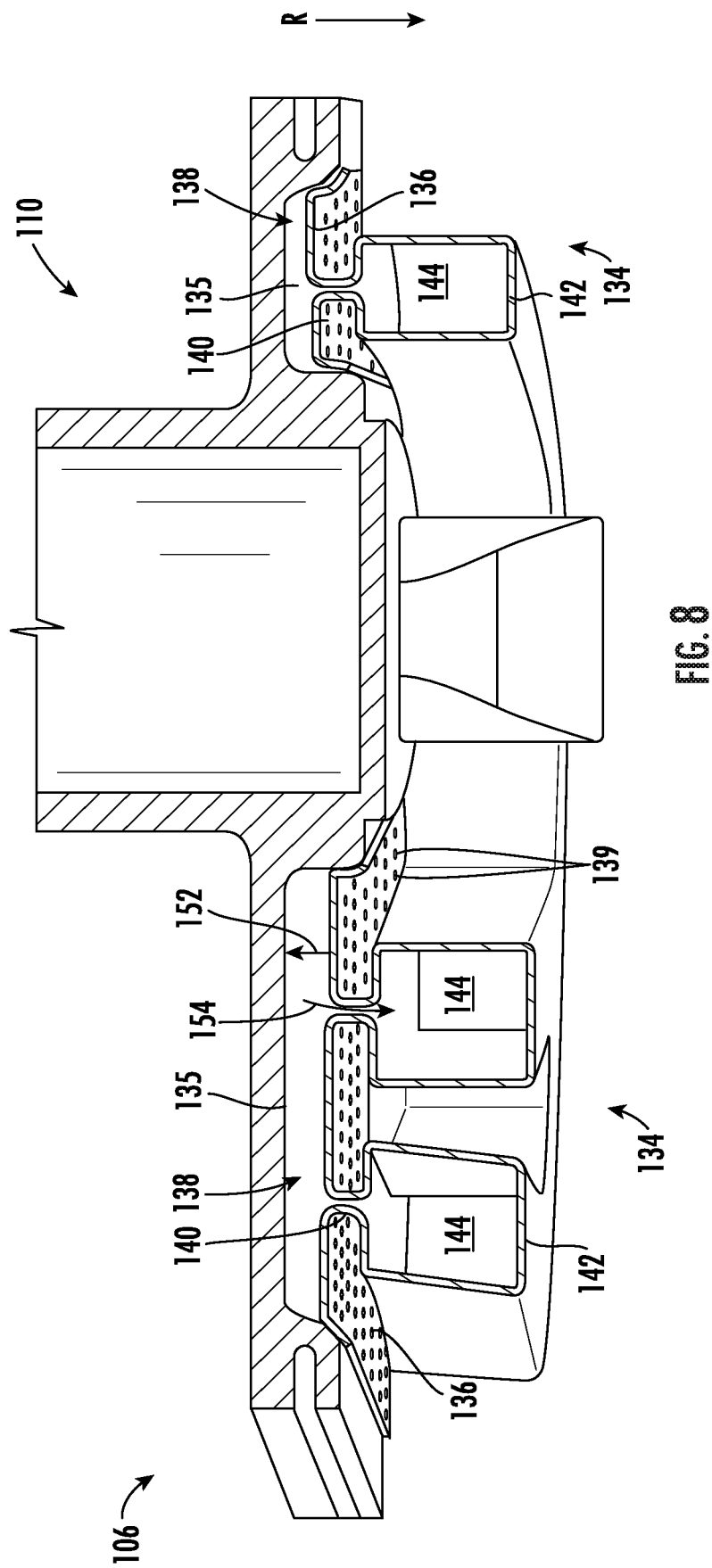
FIG. 8 is an enlarged cross-sectional view of a portion of an inner liner segment of an integrated combustor nozzle, in accordance with embodiments of the present disclosure.

FIG. 7 illustrates an enlarged cross-sectional view of a portion of the outer liner segment 108, and FIG. 8 illustrates an enlarged cross-sectional view of a portion of the inner liner segment 106, in accordance with exemplary embodiments of the integrated combustor nozzle 100. In many embodiments, the integrated combustion nozzle 100 may include an outer impingement panel 130 and an inner impingement panel 134 on either side of the combustion liner 110, in order to provide impingement cooling to the entire outer liner segment 108 and inner liner segment 106.

As shown in FIGS. 7 and 8, both the outer impingement panel 130 and the inner impingement panel 134 may include an impingement plate 136 that is disposed along the exterior surfaces 131, 135 of the outer liner segment 108 and the inner liner segment 106, respectively. For example, the impingement plate 136 of the outer impingement panel 130 may be disposed along the exterior surface 131, i.e. radially outer surface, of the outer liner segment 108. Similarly, the impingement plate 136 of the inner impingement panel 134 may be disposed along the exterior surface 135, i.e. radially inner surface, of the inner liner segment 106. In exemplary embodiments, as shown, each impingement plate 136 may be spaced from the respective exterior surfaces 131, 135 along the radial direction R to form a cooling flow gap 138 therebetween. For example, with respect to the outer impingement panels 130, the impingement plates 136 may be spaced outwardly from the exterior surface 131 of the outer liner segment along the radial direction R, thereby forming the cooling flow gap 138 therebetween. Similarly, the impingement plates 136 of the inner impingement panels 134 may be spaced inward from the exterior surface 135 of the inner liner segment 106 along the radial direction R, thereby forming the cooling flow gap 138 therebetween.

As shown in FIGS. 7 and 8, the various arrows may represent the flow path of air within the impingement panels 130, 134. In exemplary embodiments, the high pressure plenum 34 may be in fluid communication with the cooling flow gap 138 via a plurality of impingement holes 139 that are defined through the impingement plates 136 along the radial direction R. Specifically, the impingement holes 139 may be sized and oriented to direct pre-impingement air 152 from the high pressure plenum 34 in discrete jets to impinge upon the exterior surface 131, 135 of the outer liner segment 108 and the inner liner segment 106. The discrete jets of pre-impingement air 152 may then impinge (or strike) the exterior surface 131, 135 and create a thin boundary layer of air over the exterior surface 131, 135, which allows for optimal heat transfer between the liner segments 106, 108 and the air. Once the air has impinged upon the exterior surface 131, 135, it may be referred to as "post-impingement air" and/or "spent cooling air" because the air has undergone an energy transfer and therefore has different characteristics. For example, the spent cooling air 154 may have a higher temperature and lower pressure than the pre-impingement air 152 because it has removed heat from the combustion liner segments 106, 108 during the impingement process.

Figure 10:
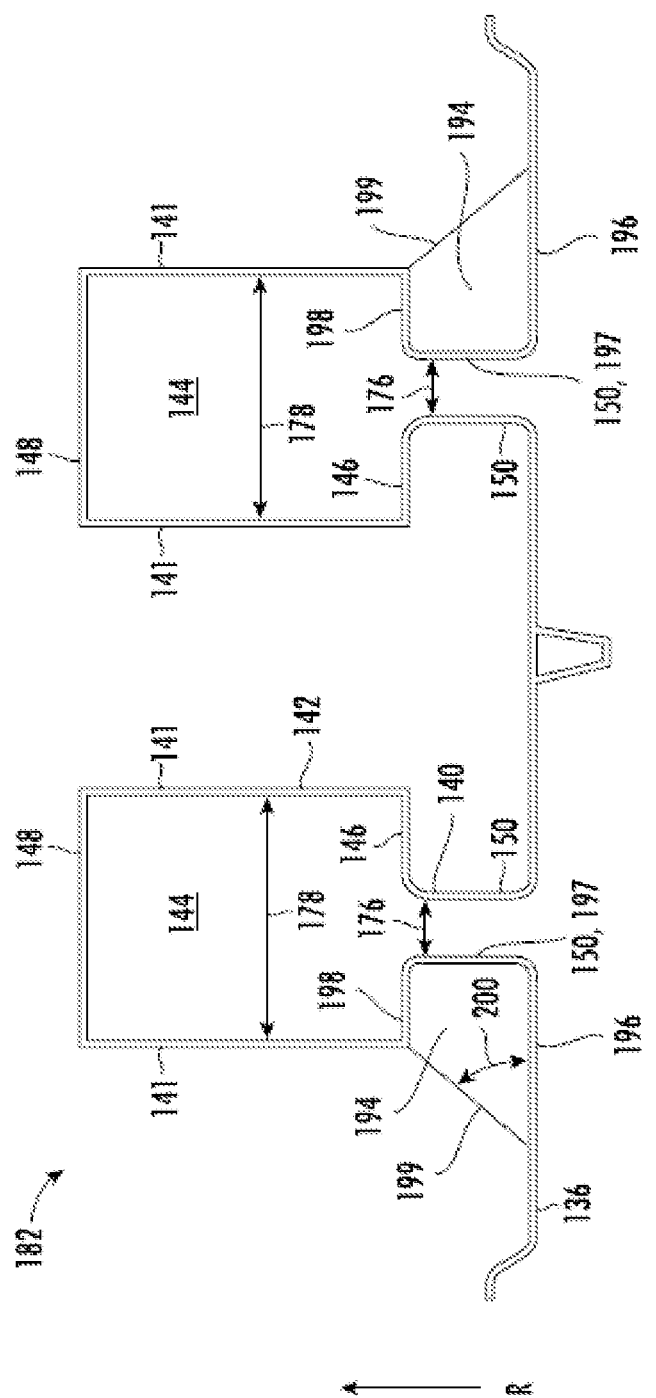
FIG. 10 is a cross sectional view of a panel segment of an impingement panel from along the axial direction A of the turbomachine, and in accordance with embodiments of the present disclosure.

In exemplary embodiments, an inlet portion 140 extends from the impingement plate 136 to a collection duct 142. As shown in FIG. 7, the collection duct 142 may define a collection passage 144 that receives post impingement air 154 from the cooling flow gap 138 via the inlet portion 140 and guides the post impingement air 154 towards the low pressure inlet 408 of the cooling insert 400 to be utilized within the fuel injectors 160, 161 (FIG. 6). In many embodiments, as shown in FIG. 7, the inlet portion 140 may provide a passageway between the cooling flow gap 138 and the collection passage 144. For example, the inlet portion 140 may extend directly from the impingement plate 136 to the collection duct 142, such that the inlet portion 140 directly fluidly couples the cooling flow gap 138 to the collection passage 144. In various embodiments, as shown in FIG. 10, the inlet portion 140 may include side walls 150 spaced apart from one another. The side walls 150 may extend axially along the impingement plate 130, parallel to one another, such that they define an elongated slot shaped opening 188 (FIG. 11) through the impingement plate 136 for the passage of post-impingement air 154.

In particular embodiments, as shown in FIG. 10, each collection duct 142 may have a cross-sectional shape that defines a rectangular area. For example, each collection duct 142 may include a radially inward wall 146, a radially outward wall 148, and side walls 141 that extend between the radially inward wall 146 and the radially outward wall 148. In particular embodiments, the side walls 141 of the collection duct 142 may be parallel to one another and longer than the radially inward/outward walls 146, 148, which advantageously allows the collection duct 142 to have a large collection area without overlapping the impingement holes 139 and causing an impediment to the airflow between the high pressure plenum 34 and the cooling flow gap 138. In other embodiments (not shown), the collection duct may have any suitable cross sectional shape, such as a circle, oval, diamond, square, or other suitable polygonal shape, and should therefore not be limited to any particular cross sectional shape unless specifically recited in the claims.

As shown in FIG. 10, the inlet portion 140 may define a first width 176 and the collection duct 142 may define a second width 178. More specifically, the first width 176 may be defined between the side walls 150 of the inlet portion 140. Similarly, the second width 178 of the collection duct 142 may be defined between the side walls 141 of the collection duct 142. It may be advantageous to have the first width 176 be as small as possible relative to the second width 178 of the collection duct 142, in order to maximize the amount of area that can be impingement cooled by the impingement plate 136. For example, in exemplary embodiments, the second width 178 of the collection duct 142 may be larger than the first width 176 of the inlet portion 140.

Figure 9:
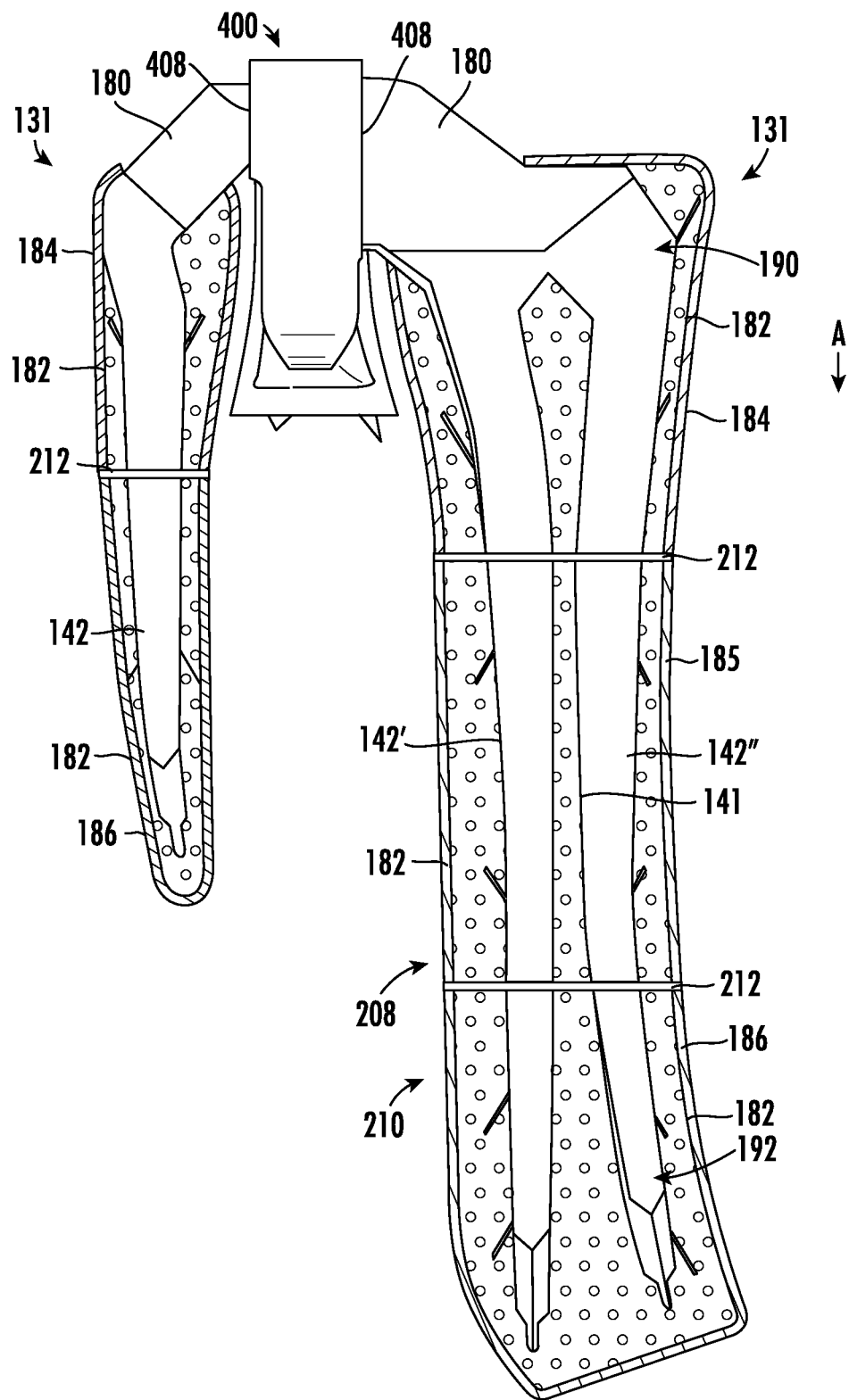
FIG. 9 is a plan view from along the radial direction R of two impingement panels and a cooling insert, isolated from the other components of the integrated combustor nozzle, in accordance with embodiments of the present disclosure.

In many embodiments, as shown in FIG. 9, the collection duct 142 may be a first collection duct 142', and the impingement panel 130 may further include a second collection duct 142" that extends from the impingement panel 130. As shown, the first collection duct 142' and the second collection duct 142" may be spaced apart from one another and may extend generally parallel to one another in the axial direction A. In such embodiments, each collection duct 142', 142" may be coupled to the impingement plate 136 via respective inlet portions 140, which provides a passageways between the cooling flow gap 138 and the collection passages 144. For example, the respective inlet portions 140 may each extend directly from the impingement plate 136 to the collection duct 142, such that they directly fluidly couple the cooling flow gap 138 to the respective collection passages 144.

FIG. 9 illustrates a plan view along the radial direction R of two impingement panels 131 and a cooling insert 400 isolated from the other components of the integrated combustor nozzle. As shown in FIG. 9, the impingement panels 131 may be representative of either or both of the outer impingement panel 130 and/or the inner impingement panel 134. In many embodiments, each of the impingement panels 130 may couple to the low pressure inlet 408 of the cooling insert 400. In particular embodiments, each of the collection ducts 142 may couple to the low pressure inlet 408 via a connection duct 180. In some embodiments (not shown), the collection ducts 142 may couple directly to the respective low pressure inlets 408 of the cooling insert 400. As discussed below in detail, the low pressure inlets 408 of the cooling insert 400 may be in direct fluid communication with the collection passageway 406, and therefore in fluid communication with the suction side fuel injector 161. In this way, the collection ducts 142 advantageously provide a passageway for post-impingement air 154 to travel to a fuel injector where they may be used to produce combustion gases within the secondary combustion zone 104.

In many embodiments the impingent panels 130 may be a singular body that extends continuously from a forward end to an aft end. However, in exemplary embodiments, as shown in FIG. 9 the impingement panels 130 may include a plurality of panel segments 182 coupled to one another. For example, in many embodiments, the impingement panel 130 may include two panel segments 182, such as a forward segment 184 and an aft segment 186 coupled together. In other embodiments, the impingement panel may include three or more segments, such as a forward segment 184, a middle segment 185, and an aft segment 186. In such embodiments, the forward segment 184 and the aft segment 186 may each independently couple to the middle segment 185, as shown. Dividing the impingement panels 130 into panel segments 182 may advantageously allow for an increased number of impingement panels 130 to be manufactured, such as through additive manufacturing, at one time, which can result in production cost savings.

Figure 11:
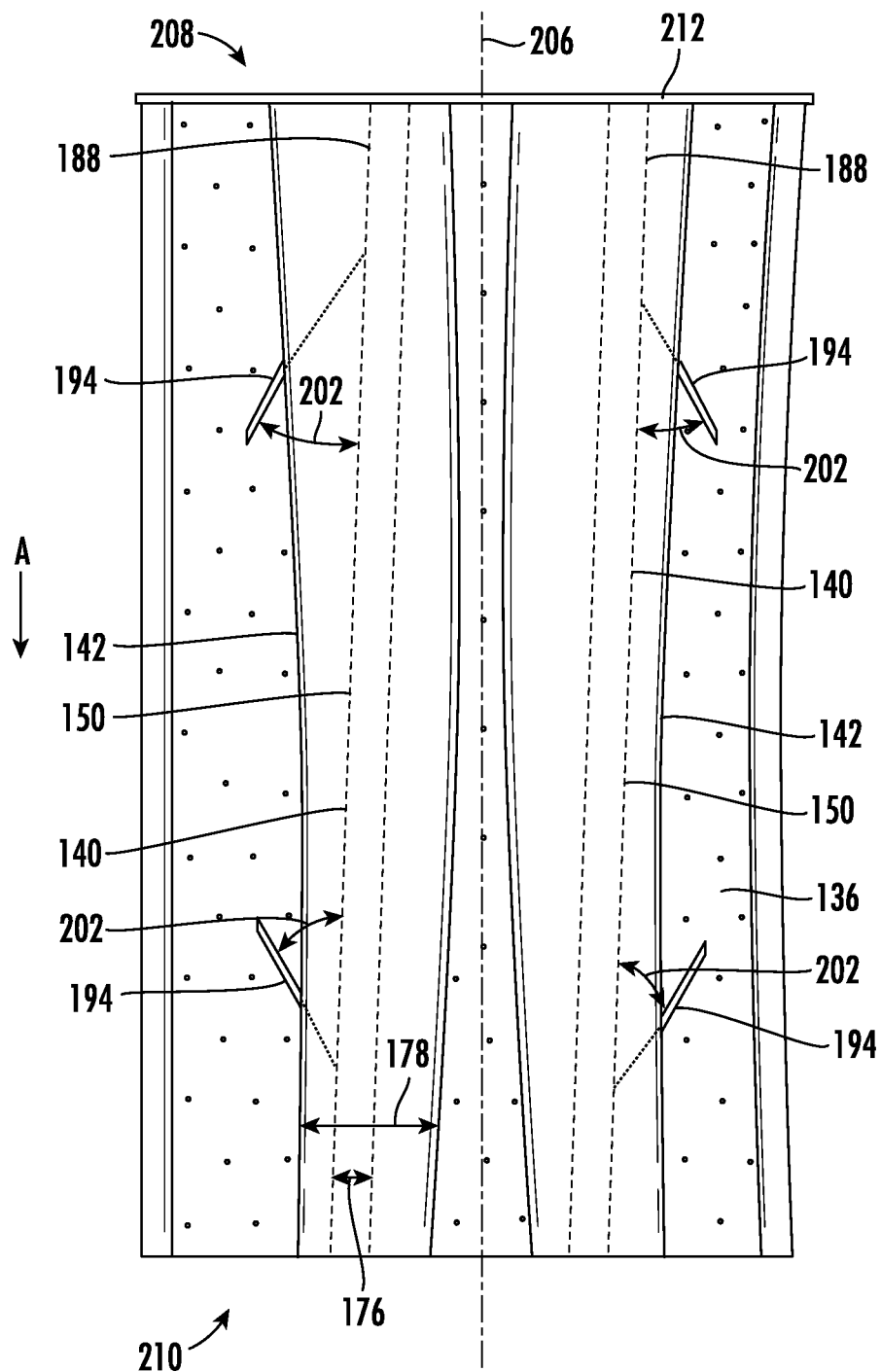
FIG. 11 is plan view of the panel segment shown in FIG. 10 from along the radial direction R of the turbomachine, in accordance with embodiments of the present disclosure.

As illustrated by the hidden lines in FIG. 11, the inlet portion 140 of each of the panel sections 182 may further define an elongated slot opening 188 through the respective impingement plates 136 that allows post impingement air 154 to flow from the cooling gap into the collection duct 142. In some embodiments (not shown), the elongated slot opening 188 may be continuous between the panel segments 182.

In various embodiments, as shown in FIG. 9, each of the collection ducts 142 may converge in cross sectional from a forward end 190 to an aft end 192, i.e., in the axial direction A. More specifically, the side walls 141 of the collection duct 142 may converge towards one another from the forward end 190 to the aft end of the impingement panel 130, thereby gradually reducing the second width 178 and the cross-sectional area of the collection duct 142 as it extends in the axial direction A. Gradually reducing the cross-sectional area of the collection duct 142 from a forward end 190 to an aft end 192 of the impingement panel 130 may favorably influence the post impingement air 154 to flow towards the cooling insert 400, i.e., in a direction opposite the axial direction.

In operation, the collection duct 142 may receive spent cooling air from the cooling flow gap 138. As used herein, the terms "post-impingement air" and/or "spent cooling air" refer to air that has already impinged upon a surface and therefore undergone an energy transfer. For example, the spent cooling air may have a higher temperature and lower pressure than prior to having impinged upon the exterior surface 131, 135, which makes the spent cooling air non-ideal for further cooling within the integrated combustion nozzle. However, the collection duct 142 advantageously collects the spent cooling air and directs it towards one or more fuel injectors, e.g., the fuel injection module 117 and/or one or both fuel injectors 160 and 161, for use in either the primary combustion zone 102 or the secondary combustion zone 104. In this way, the impingement panel 130 efficiently utilizes air from the high pressure plenum 34 by first utilizing the air to cool the liner segments 106, 108 and then using the air to produce combustion gases that power the turbine section 18.

In many embodiments, each of the panel segments 182 may be integrally formed as a single component. That is, each of the subcomponents, e.g., the impingement plate 136, the inlet portion 140, the collection duct 142, and any other subcomponent of the panel segments 182, may be manufactured together as a single body. In exemplary embodiments, this may be done by utilizing the additive manufacturing system 1000 described herein. However, in other embodiments, other manufacturing techniques, such as casting or other suitable techniques, may be used. In this regard, utilizing additive manufacturing methods, each panel segment 182 of the impingement panel 130 may be integrally formed as a single piece of continuous metal, and may thus include fewer sub-components and/or joints compared to prior designs. The integral formation of each panel segment 182 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. In some embodiments, the entire impingement panel 130 may be integrally formed as a single component.

FIG. 10 illustrates a cross sectional view of a panel segment 182 of the impingement panel 130 from along the axial direction A, and FIG. 11 illustrates plan view of a panel segment 182 from along the radial direction R, in accordance with embodiments of the present disclosure. It will be appreciated that the features of the panel segment 182 shown in FIGS. 10 and 11 can be incorporated into any of the panel segments described herein, such as forward segment 184, middle segment 185, and/or the aft segment 186.

As shown in FIGS. 10 and 11, the panel segment 182 may further include one or more supports 194 that extend between, and are integrally formed with, the inlet portion 140, the collection duct 142, and the impingement plate 136, in order to provide structural support thereto. In various embodiments, each support 194 may be shaped substantially as a flat plate that extends between the impingement plate 136 and the collection duct 142. In particular embodiments, each support 194 may extend from a first end 196 integrally formed with to the impingement plate 136 to a second end 198 integrally formed with the collection duct 142. In exemplary embodiments, the support 194 may be fixedly coupled to the panel segment 182, e.g., the support 194 may be a separate component that is welded and/or brazed on to the panel segment 182. Utilizing the supports 194 in this way provides additional structural integrity to the collection duct 142, which may advantageously prevent damage to the impingement panel 130 caused from vibrational forces of the gas turbine 10 during operation.

In particular embodiments, each of the supports 194 includes a first side 197 and a second side 199 that extend between the first end 196 and the second end 198 of each of the supports 194, i.e., between the impingement plate 136 and the collection duct 142. As shown in FIG. 10, the first end 196, second end 198, first side 197, and second side 199 may collectively define the perimeter of the support 194. In many embodiments, the first side 197 of the support 194 extends along and is integrally formed with one of the side walls 150 of the inlet portion 140. In exemplary embodiments, the second side 199 of the support 194 may be a generally straight line that extends from the impingement plate 136 at an angle 200.

For example, in many embodiments, the second side 199 of each support 194 may form an angle 200 of between about 10° and about 75° with the impingement plate 136. In other embodiments, the second side 199 of each support 194 may form an angle 200 of between about 20° and about 65° with the impingement plate 136. In various embodiments, the second side 199 of each support 194 may form an angle 200 of between about 30° and about 55° with the impingement plate 136. In particular embodiments, the second side 199 of each support 194 may form an angle 200 of between about 40° and about 50° with the impingement plate 136.

Figure 15:
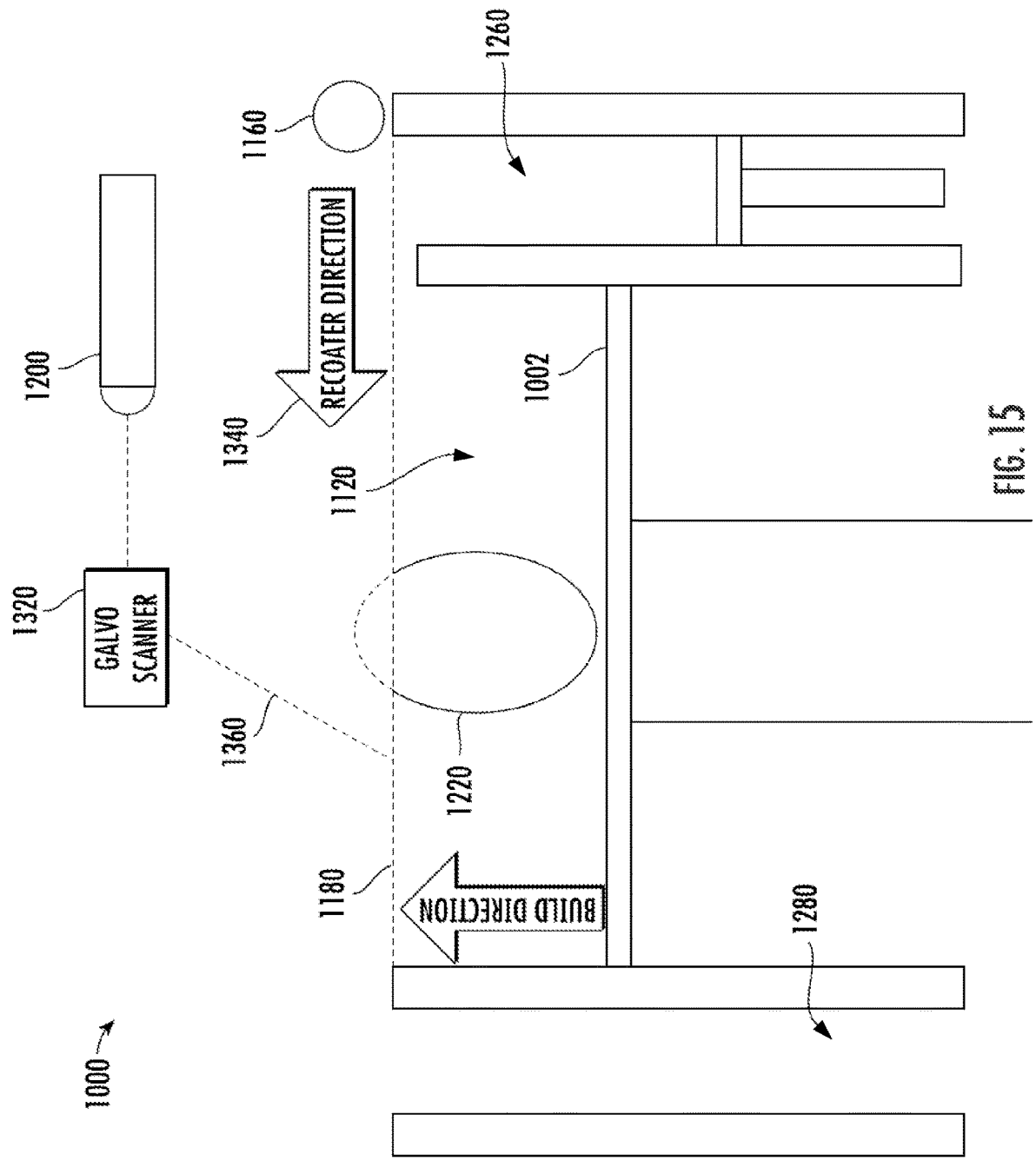
FIG. 15 is a schematic/block view of an additive manufacturing system for generating an object, in accordance with embodiments of the present disclosure.

In exemplary embodiments, the angle 200 of the second side 199 may advantageously provide additional structural support to the impingement panel 130, thereby preventing vibrational damage to the impingement panel 130 during operation of the gas turbine 10. In addition, the angle 200 of the second side 199, may provide additional structural support to the collection duct 142 during the additive manufacturing process of the impingement panel 130, which advantageously reduces the likelihood of distortion and/or defects in the impingement panel 130. For example, the angle 200 of the second side 199 relative to the impingement plate 136 discussed herein may prevent the support 194 from overhanging, i.e. having excessive thick-to-thin variation, while being fabricated using the additive manufacturing system 1000 (FIG. 15). As a result, the impingement panel 130, which would otherwise be difficult to manufacture via traditional means due to its complex geometry, may be fabricated using an additive manufacturing system 1000 without causing defects or deformations in the part.

As shown in FIG. 11, the each of the supports 194 may form an angle 202 with the inlet portion 140 (shown as dashed lines in FIG. 11). More specifically, each of the supports 194 may form the angle 202 with the side wall 150 of the inlet portion 140. In many embodiments, the angle 202 may be oblique, which favorably allows the support 194 to extend further along the impingement plate 136. However, in other embodiments (not shown), the one or more of the supports 194 may be perpendicular to the inlet portion 140.

In various embodiments, the angle 202 between the side wall 150 of the inlet portion 140 and the support 194 may be between about 10° and about 90°. In other embodiments, the angle 202 between the side wall 150 of the inlet portion 140 and the support 194 may be between about 20° and about 70°. In particular embodiments, the angle 202 between the side wall 150 of the inlet portion 140 and the support 194 may be between about 30° and about 60°. In many embodiments, the angle 202 between the side wall 150 of the inlet portion 140 and the support 194 may be between about 40° and about 50°.

As shown in FIG. 11, the panel segment 182 may further include center axis 206, which may be generally parallel to the side walls 150 of the inlet portion 140. In many embodiments, when the panel segment 182 is installed in an integrated combustor 100, the center axis 206 may extend coaxially with the axial direction A the gas turbine 10. In other embodiments, the center axis 206 may extend generally parallel to the axial direction A, when the panel segment is installed in an integrated combustor nozzle 100.

Figure 12:
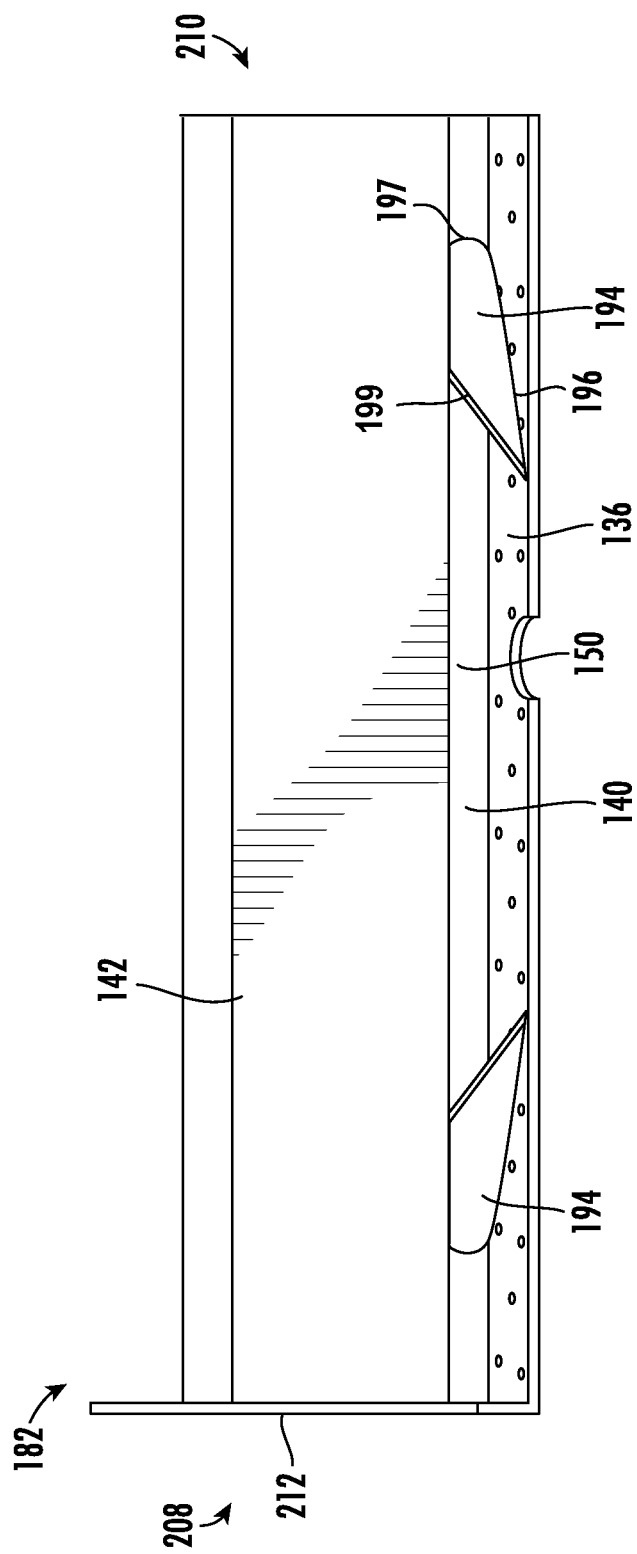
FIG. 12 is a cross-sectional perspective view of a panel segment, in accordance with embodiments of the present disclosure.
Figure 13:
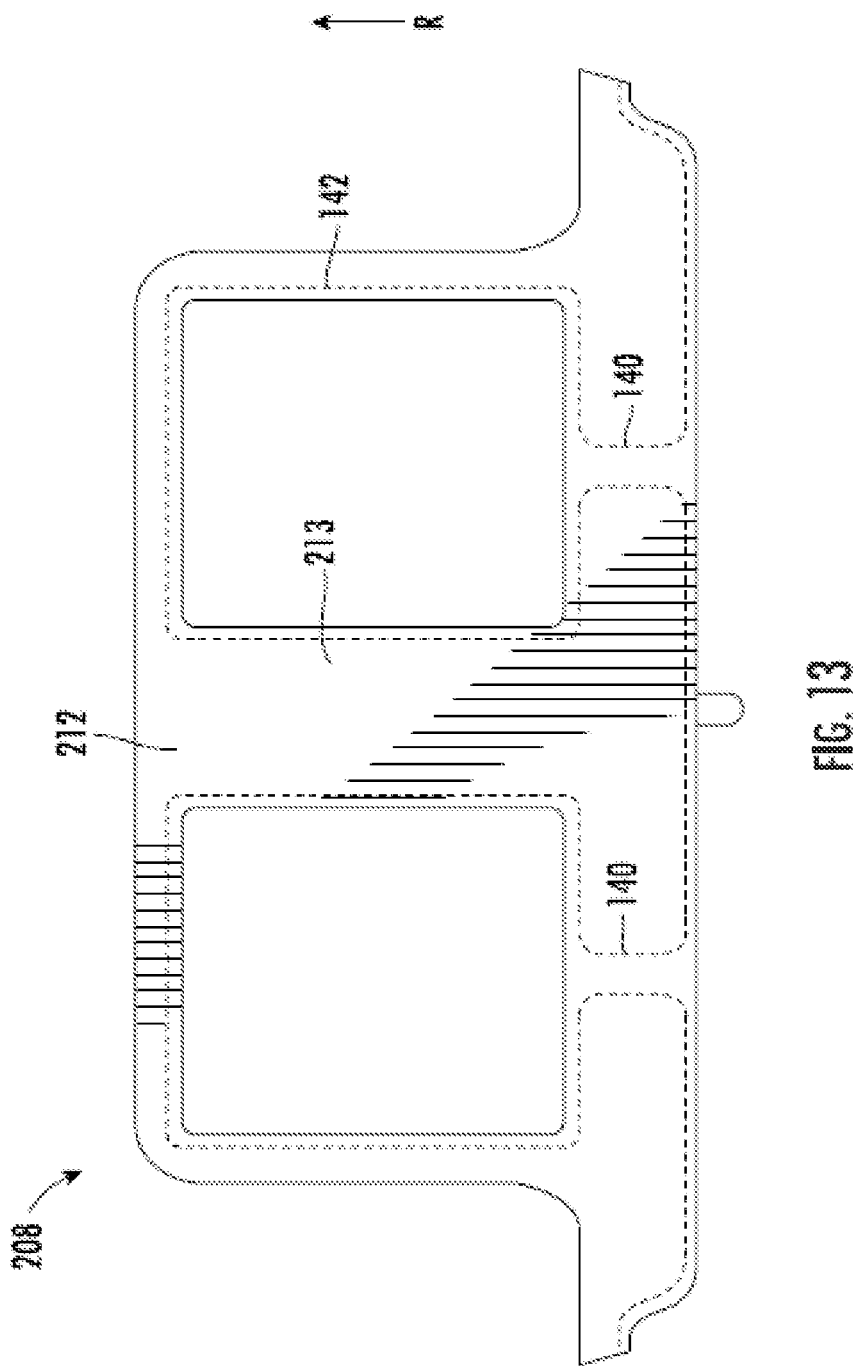
FIG. 13 is a plan view of a first end of the panel segment shown in FIGS. 10-12 from along a center axis, in accordance with embodiments of the present disclosure.

FIG. 12 illustrates a cross-sectional perspective view of a panel segment 182, in accordance with embodiments of the present disclosure. The panel segment 182 may extend from a first end 208, along the center axis 206 (FIG. 11), to a second end 210. FIG. 13 illustrates a plan view of an exemplary embodiment of the first end 208 of the panel segment 182 from along the center axis 206, and FIG. 14 illustrates the second end 210 of the panel segment 182 from along the center axis 206.

As shown in FIG. 13, the first end 208 of the panel segment 182 includes a flange 212 that extends from the impingement panel. In various embodiments, the flange 212 may be a generally flat plate that extends from first end 208 of the panel segment 182. More specifically, the flange 212 may be perpendicular to, and extend away from, the impingement plate 136, the inlet portion 140, and the collection duct 142 at the first end 208 of the panel segment 182, in order to define a connection surface 213 (FIG. 13). The connection surface 213 advantageously allows multiple panel segments 182 to be fixedly coupled together, by a means such as welding, brazing, or other suitable methods. In many embodiments, the flange 212 may also increase the overall rigidity and structural integrity of the panel segment 182, thereby preventing vibrational damage that could be caused to the component during operation of the gas turbine 10.

In many embodiments, the flange 212 may be integrally formed with the panel segment 182, such that the collection plate 136, the inlet portion 140, the collection duct 142, and the flange 212 may be a single piece of continuous metal. In such embodiments, the flange 212 may also provide manufacturing advantages. For example, the flange 212 generally surrounds the features of the panel segment 182 and provides additional structural support for the collection duct 142 during the additive manufacturing process.

Figure 14:
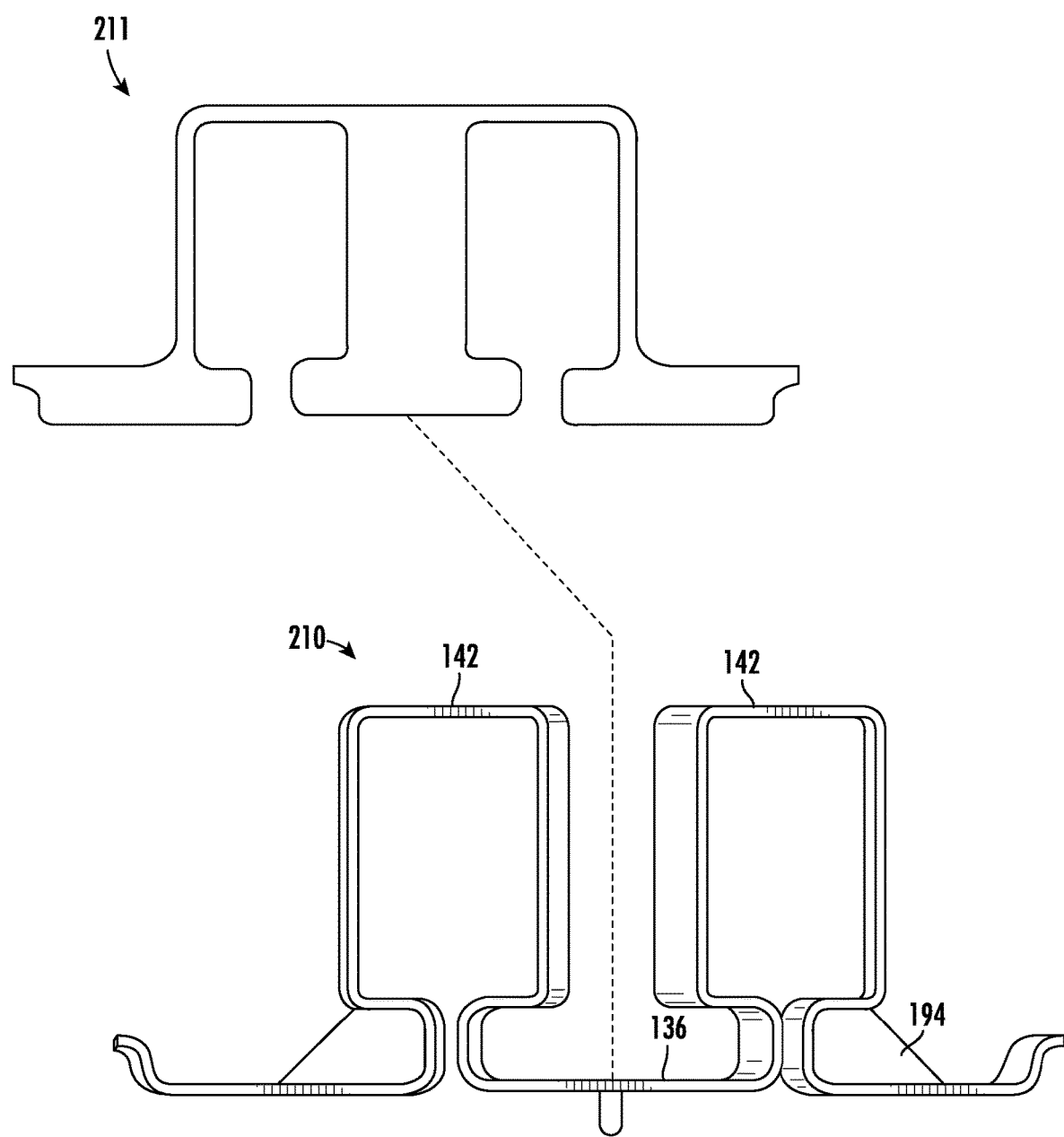
FIG. 14 is a plan view of a second end of the panel segment shown in FIGS. 10-12 from along a center axis, in accordance with embodiments of the present disclosure.

As shown in FIG. 14, in some embodiments, the second end 210 of the impingement panel 182 may not include the flange 212 that is integrally formed therewith, as is the case with the first end 208. As indicated by the dashed line in FIG. 14, an end plate 211 may be attached to the second end 210 and fixedly coupled thereto. For example, the end plate 211 may be an entirely separate component from the impingement panel segment 182. In many embodiments, the end plate 211 may be welded or brazed to the second end 210 after the manufacturing of the impingement panel segment 182 is complete. The end plate 211, which is fixedly coupled to the second end 210, may have a substantially similar geometry as the flange 212, but is a separate component rather than being integrally formed. The end plate 211 may function to couple the second end 210 of the impingement panel segment 182 to the first end 208 of a neighboring impingement panel segment (as shown in FIG. 9). In exemplary embodiments, the end plate 211 of an impingent panel segment 182 may be fixedly coupled to the flange 212 of a neighboring impingement panel segment 182. Coupling the impingement panel segments 182 in this way may be advantageous because the end plate 211 and the flange 212 are relatively flat and smooth surfaces that provide for an easy and error free weld therebetween. In other embodiments, both the first end 208 and the second end 210 may include a flange 212, in which the flange 212 of the first end 208 of a panel segment 182 may fixedly couple to the flange 212 of the second end 210 of a neighboring panel segment 182.

To illustrate an example of an additive manufacturing system and process, FIG. 15 shows a schematic/block view of an additive manufacturing system 1000 for generating an object 1220, such as the panel segments 182, the cooling insert 400, and/or the impingement cooling apparatus 300 described herein. FIG. 15 may represent an additive manufacturing system configured for direct metal laser sintering (DMLS) or direct metal laser melting (DMLM). The additive manufacturing system 1000 fabricates objects, such as the object 1220 (which may be representative of the panel segments 182, the cooling insert 400, and/or the impingement cooling apparatus 300 described herein). For example, the object 1220 may be fabricated in a layer-by-layer manner by sintering or melting a powder material (not shown) using an energy beam 1360 generated by a source such as a laser 1200. The powder to be melted by the energy beam is supplied by reservoir 1260 and spread evenly over a build plate 1002 using a recoater arm 1160 to maintain the powder at a level 1180 and remove excess powder material extending above the powder level 1180 to waste container 1280. The energy beam 1360 sinters or melts a cross sectional layer of the object being built under control of the galvo scanner 1320. The build plate 1002 is lowered and another layer of powder is spread over the build plate and the object being built, followed by successive melting/sintering of the powder by the laser 1200. The process is repeated until the object 1220 is completely built up from the melted/sintered powder material. The laser 1200 may be controlled by a computer system including a processor and a memory. The computer system may determine a scan pattern for each layer and control laser 1200 to irradiate the powder material according to the scan pattern. After fabrication of the object 1220 is complete, various post-processing procedures may be applied to the object 1220. Post processing procedures include removal of excess powder by, for example, blowing or vacuuming. Other post processing procedures include a stress release process. Additionally, thermal and chemical post processing procedures can be used to finish the object 1220.

Figure 16:
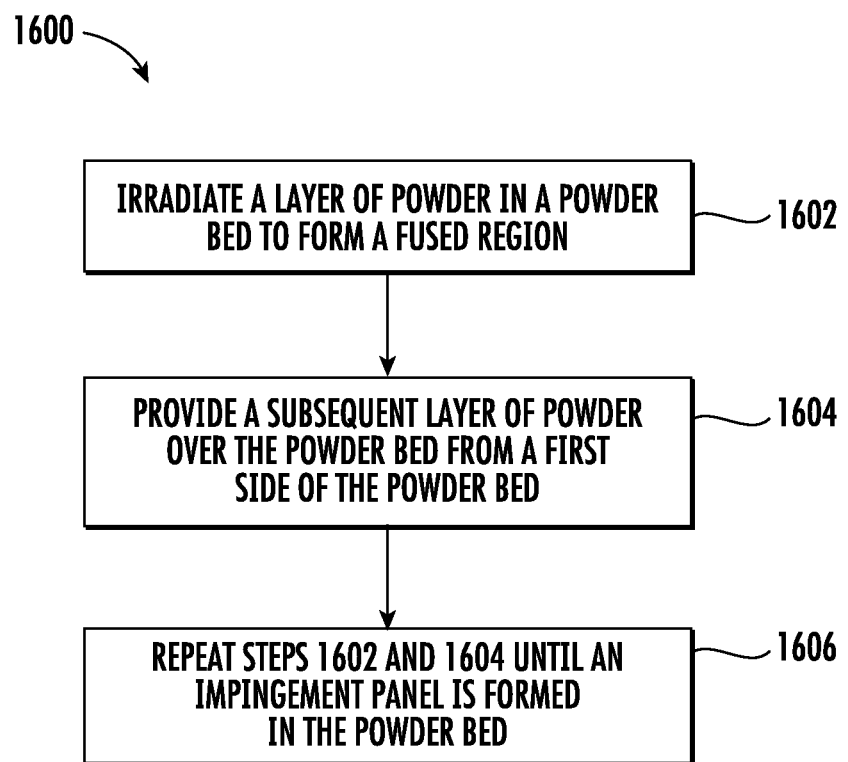
FIG. 16 is a flow chart a method for fabricating an impingement panel, in accordance with embodiments of the present disclosure.

FIG. 16 is a flow chart of a sequential set of steps 1602 through 1606, which define a method 1600 of fabricating an impingement panel (such as one of the impingement panels 130, 131, 134 described herein), in accordance with embodiments of the present disclosure. The method 1600 may be performed using an additive manufacturing system, such as the additive manufacturing system 1000 described herein or another suitable system. As shown in FIG. 16, the method 1600 includes a step 1602 of irradiating a layer of powder in a powder bed 1120 to form a fused region. In many embodiments, as shown in FIG. 15, the powder bed 1120 may be disposed on the build plate 1002, such that the fused region is fixedly attached to the build plate 1002. The method 1600 may include a step 1604 of providing a subsequent layer of powder over the powder bed 1120 from a first side of the powder bed 1120. The method 1600 further includes a step 1606 of repeating steps 1602 and 1604 until the impingement panel is formed in the powder bed 1120.

FIG. 17 illustrates a perspective view of the impingement cooling apparatus 300, which is isolated from the integrated combustor nozzle and positioned on a build plate 1002, and in which one of the impingement members in a row has been cut away. As discussed below, the impingement cooling apparatus 300 may be additively manufactured on a build plate 1002, e.g., by the additive manufacturing system 1000. FIG. 17 depicts the impingement cooling apparatus 300 prior to removal from the build plate 1002 and installation into the integrated combustor nozzle 100, in accordance with embodiments of the present disclosure.

As shown in FIG. 17, the impingement cooling apparatus 300 may extend in the radial direction R, which may coincide with the build direction, from a first end 306 to a second end 308. In many embodiments, the impingement cooling apparatus 300 includes a plurality of impingement members 302, which are arranged in a first row 320 of impingement members 302 and a second row 322 of impingement members 302. Each impingement member 302 in the first row 320 of impingement members 302 may extend from a first flange 310 at the first end 306 to a respective closed end 312 at the second end 308 of the impingement cooling apparatus 300. Similarly, each impingement member 302 in the second row 322 of impingement members 302 may extend from a second flange 311 at the first end 306 to a respective closed end 312 at the second end 308 of the impingement cooling apparatus 300. In this way, the first row 320 and the second row 322 of impingement members 302 may each be singular components capable of movement relative to one another during installation into the cavity 126, which advantageously allows the distance between the rows 320, 322 of impingement members 302 and the walls 116, 118 to be independently set from one another.

In other embodiments, each impingement member 302 may be its own entirely separate component, which is capable of movement relative to the other impingement members 302 in the impingement cooling apparatus 300. In such embodiments, each impingement member 302 may extend from a respective flange. In embodiments where each impingement member 302 is a separate component, the impingement members may be installed individually within the integrated combustor nozzle (i.e. one at a time), and each standoff 356, 358 may serve to ensure that a properly sized gap is disposed between each impingement member 302 during both the installation of the impingement members 302 and the operation thereof.

Figure 19:
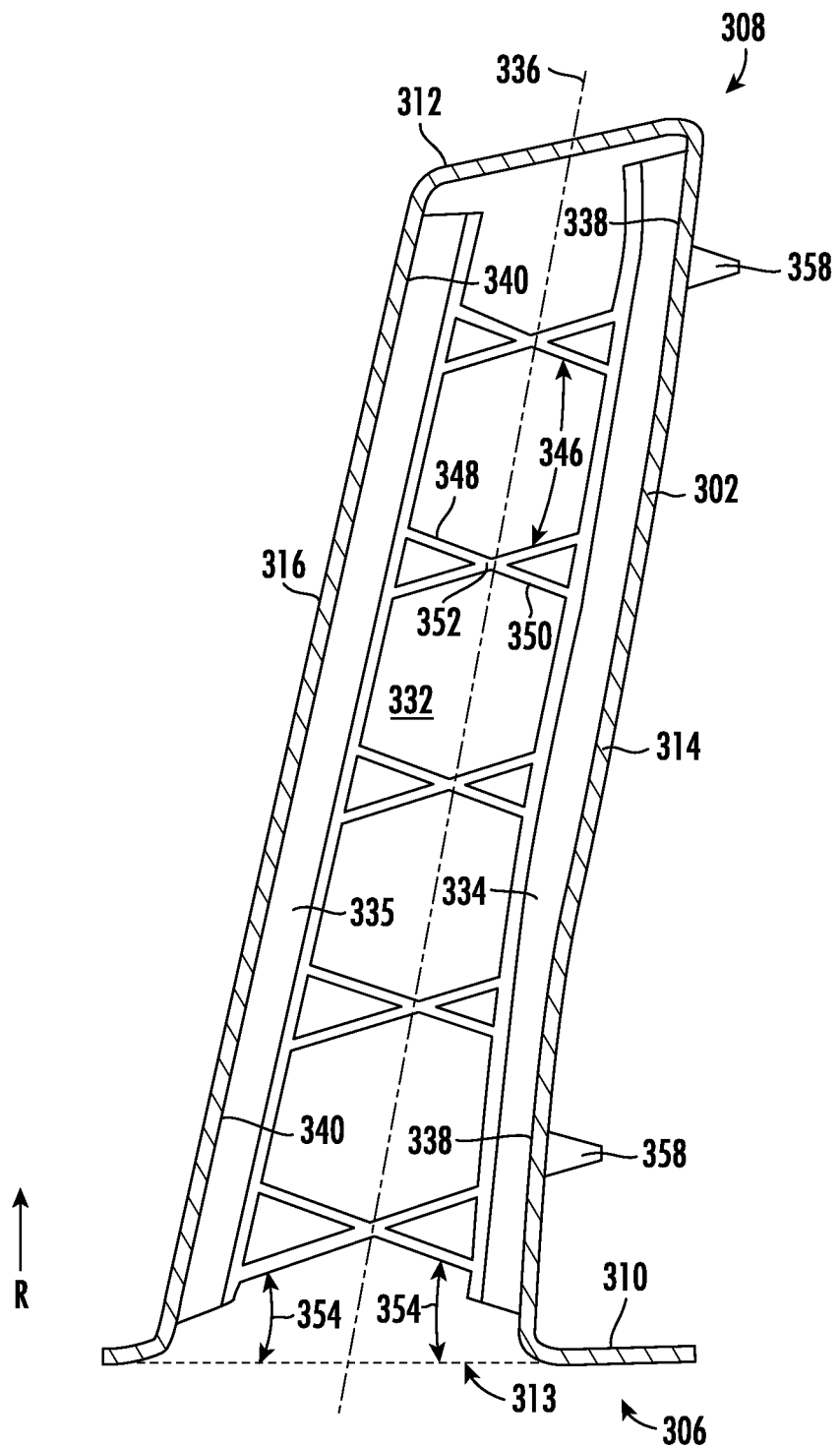
FIG. 19 is a cross-sectional view of a single impingement member, in accordance with embodiments of the present disclosure.

In exemplary embodiments, each of the impingement members 302 may be substantially hollow bodies that extend from a respective opening 313 defined in the flanges 310, 311 to a respective closed end 312 (FIG. 19). Although the embodiment in FIG. 17 shows an impingement cooling apparatus 300 having eleven impingement cooling members 302, the impingement cooling apparatus 302 may have any number of impingement members 302, e.g., 4, 6, 8, 12, 14, or more. In various embodiments, as shown in FIG. 17, each impingement member 302 in the plurality of impingement members 302 may be spaced apart from directly neighboring impingement members 302, in order to define the gap 172 for post-impingement air 154 to flow between impingement members 302 and into the collection passageway 174 (FIG. 6). In many embodiments, a plurality of impingement apertures 304 may be defined on each impingement member 302 of the plurality of impingement members 302

Figure 18:
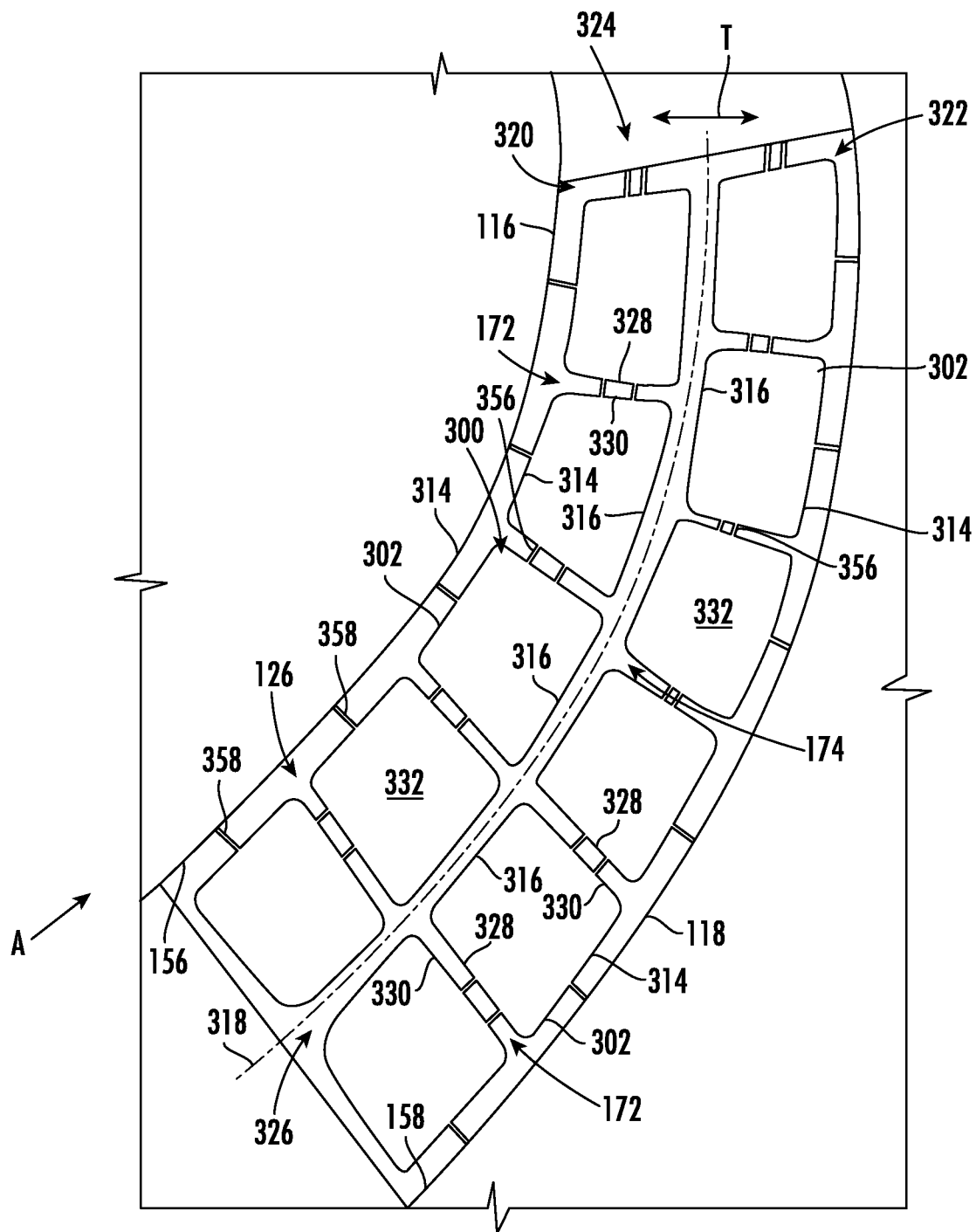
FIG. 18 is an enlarged cross-sectional view of the integrated combustor nozzle from along the radial direction R of the turbomachine, in which the impingement cooling apparatus is positioned within a cavity of the integrated combustor nozzle, in accordance with embodiments of the present disclosure.

FIG. 18 depicts an enlarged cross-sectional view of the integrated combustor nozzle 100 from along the radial direction R, in which the impingement cooling apparatus 300 is positioned within the cavity 126. As shown in FIG. 18, the integrated combustor nozzle 100 may further include a camber axis 318, which may be defined halfway between the pressure side wall 116 and the suction side wall 118. For example, the camber axis 318 may be curved and/or contoured to correspond with the curve of the pressure side wall 116 and the suction side wall 118. A transverse direction T may be defined orthogonally with respect to the camber axis 138. More specifically, the transverse direction T may extend outward from, and perpendicular to, a line that is tangent to the camber axis 318 at each location along the camber axis 318.

In particular embodiments, each impingement member 302 of the plurality of impingement members 302 includes an impingement wall 314 spaced apart from a solid wall 316. In exemplary embodiments, the plurality of impingement apertures may be defined on the impingement wall 314, in order to direct pre-impingement air 152 towards the interior surface 156, 158 of the walls 116, 118 (FIG. 6). The solid wall 316 may be oppositely disposed from the impingement wall 314. In many embodiments, the solid wall 314 of each respective impingement member 302 may be directly outward of the camber axis 318 along the transverse direction T, such that solid walls 316 of the impingement member 302 collectively define the boundary of the collection passageway 174. As used herein, the term "solid" may refer to a wall or walls that are impermeable, such that they do not allow air or other fluids to pass therethrough. For example, the each of the solid walls 316 may not have any impingement apertures, holes, or voids that would allow for pre-impingement air 152 to escape, in order to ensure all of the air gets directed towards the interior surface 156, 158 of the walls 116, 118 for cooling.

In particular embodiments, as shown in FIG. 18, the plurality of impingement members 302 may include a first row 320 of impingement members 302 disposed proximate the pressure side wall 116 and a second row 322 of impingement members 320 disposed proximate the suction side wall 118. For example, the first row 320 and the second row 322 of impingement members may be disposed on opposite sides of the camber axis 318, such that they are spaced apart in the transverse direction T. As shown in FIG. 18, the collection passageway 174 may be defined between the first row 320 and the second row 322 of impingement members 302. More specifically, the collection passageway 174 may be defined collectively between the solid walls 316 of the first row 320 of impingement members 302 and the solid walls 316 of the second row 322 of impingement members 302. As shown in FIG. 6 and discussed above, the collection passageway 174 may function to receive post impingement air 154 and direct it towards a fuel injector, such as the suction side fuel injector 161 (FIG. 6).

In particular embodiments, the first row 320 of impingement members 302 and the second row 322 of impingement members diverge away from each other from an aft end 324 to a forward end 326 of impingement cooling apparatus 300, i.e., opposite the direction of combustion gases within the combustion zones 102, 104. For example, the first row 320 of impingement members 302 and the second row 322 of impingement members diverge away from each other in the transverse direction from an aft end 324 to a forward end 326 of impingement cooling apparatus 300. In this way, the transverse distance between impingement members 302 of the first row 320 and impingement members 302 of the second row 322 may gradually increase from the aft end 324 to the forward end 326, thereby influencing post-impingement air 154 to travel towards the suction side fuel injector 161.

As shown in FIG. 18, the impingement wall 314 of each respective impingement member 302 on the first row 320 may be contoured to correspond with a portion of pressure side wall 116, such that the impingement walls 314 of the first row 320 collectively correspond to the contour of the pressure side wall 116. Similarly, the impingement wall 314 of each respective impingement member 302 on the second row 322 may be contoured to correspond with a portion of the suction side wall 118, such that the impingement walls 314 of the second row 322 collectively correspond to the contour of the suction side wall 118. Matching the contour of the walls 116, 118 advantageously maintains a desired transverse distance from the respective walls 116, 118. In many embodiments, the transverse distance between the impingement walls 314 and the respective walls 116, 118 may be generally constant.

In particular embodiments, each impingement member 302 of the plurality of impingement members 302 may include a first solid side wall 328 and a second solid side wall 330 that each extend between the impingement wall 314 and the solid wall 316. As shown in FIG. 18, the first solid side wall 328 and the second solid side wall 330 of each impingement member 302 may be spaced apart and oppositely disposed from one another. In various embodiments, the first solid wall 328 and second side wall 330 of each impingement member 302 may be generally parallel to one another in the transverse direction T. As shown in FIG. 18, the first solid side wall 328, the second solid wall 330, the impingement wall 314, and the solid wall 316 of each impingement member of the plurality of impingement members collectively defines an internal volume 332 that is in fluid communication with the high pressure plenum 34. In exemplary embodiments, each of the impingement members 302 may define a generally rectangular cross-sectional area. However, in other embodiments (not shown), the each of the impingement members 302 may define a cross sectional area having a circular shape, a diamond shape, a triangular shape, or other suitable cross-sectional shapes.

Figure 20:
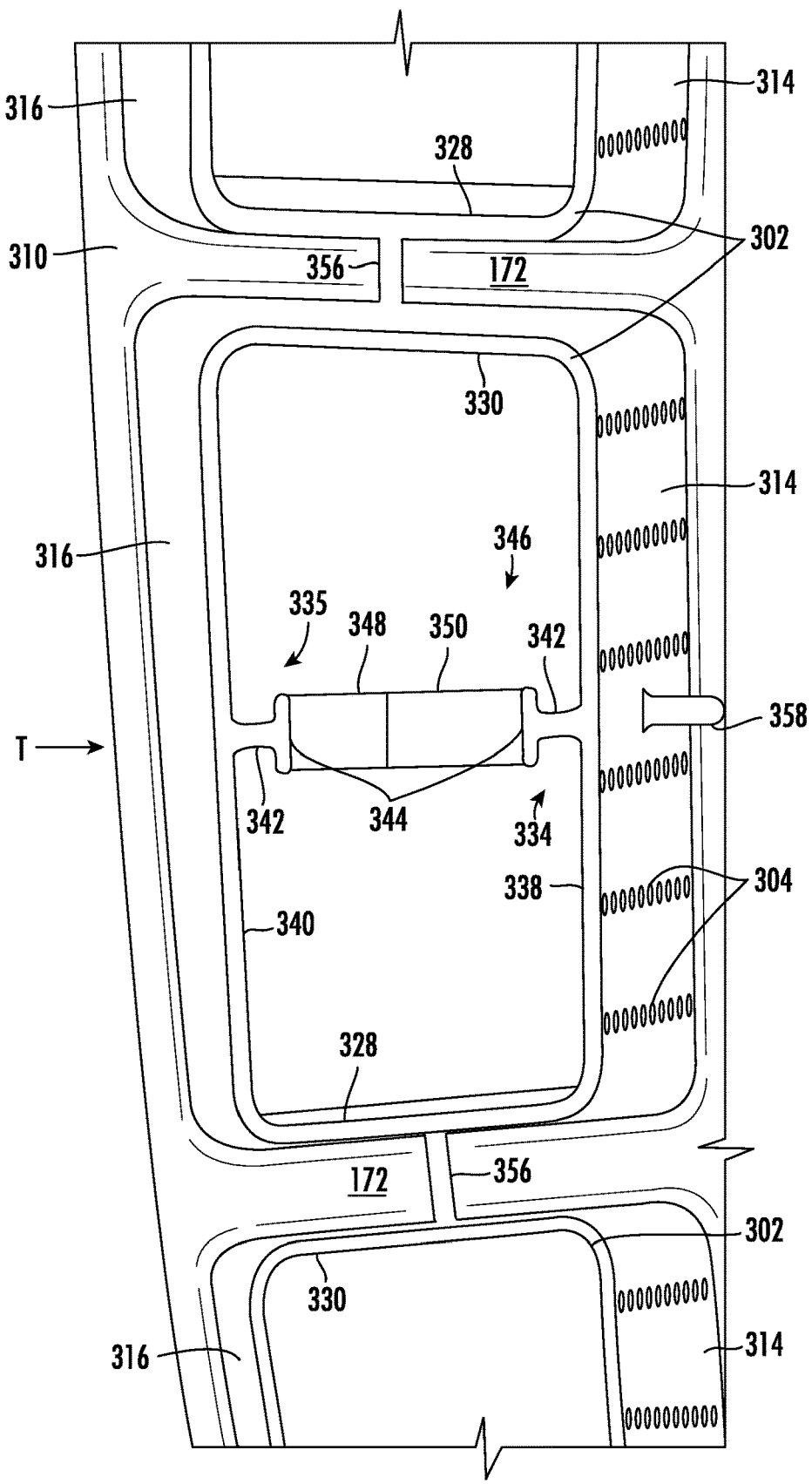
FIG. 20 an enlarged cross-sectional view of an impingement member and a portion of two neighboring impingement members from along the radial direction R of the turbomachine, in accordance with embodiments of the present disclosure.

In particular embodiments, as shown in FIGS. 6, 18 and 20, a gap 172 may be defined between directly neighboring impingement members 302, which advantageously provides a path for post impingement air 154 to travel into the collection passageway 174. In various embodiments, each of the gaps 172 may be defined directly between the first side wall 328 of an impingement member and the second side wall 330 of a directly neighboring impingement member 302. In this way, each impingement member 302 of the plurality of impingement members 302 partially defines at least one gap 172. As shown in FIG. 18, each of the gaps 172 may be defined between the first side wall 328 of an impingement member 302 and the second side wall 330 of a neighboring impingement member 302 in a direction generally parallel to the camber axis 318 at their respective locations. In other embodiments (not shown), each impingement member 302 may define a diamond shaped cross-sectional area. In such embodiments, the first side wall 328 and the second side wall 330 may be angled relative to the camber axis, which may advantageously reduce the pressure drop of the impingement air.

FIG. 19 depicts a cross-sectional view of a single impingement member 302 from along the camber axis 318. FIG. 20 illustrates an enlarged cross-sectional view of an impingement member 302 and a portion of two neighboring impingement members 302 from along the radial direction R, in accordance with embodiments of the present disclosure. It should be appreciated that the features of impingement member 302 shown in FIGS. 19 and 20 may be incorporated into any of the impingement members 302 in the plurality of impingement members 302 described herein. In exemplary embodiments, as shown in FIGS. 19 and 20, the impingement member 302 may further include a first protrusion 334, a second protrusion 335, and a plurality of cross-supports 346 extending therebetween. In many embodiments, the first protrusion may 334 be disposed on the impingement wall 314, the second protrusion 335 may be disposed on the solid wall 316, and the plurality of cross-supports 346 may each extend from the first protrusion 334, through the internal volume 332, to the second protrusion 335. Each of the protrusions 334, 335 may extend from the respective walls 314, 316 towards an axial centerline 336 (FIG. 19) of the impingement member 302. More specifically, the first protrusion 334 may extend directly from an interior surface 338 of the impingement wall 314 towards the axial centerline 336. Likewise, the second protrusion 335 may extend directly from an interior surface 340 of the solid wall 316 towards the axial centerline 336. In various embodiments, the first protrusion 334 may extend radially along the entire length of the impingement wall 314, e.g., between the open end 313 and the closed end 312 of the impingement member 302.

In particular embodiments, as shown in FIG. 20, each protrusion 334, 335 may include first portion 342 that extends generally perpendicularly between the respective walls 314, 316 and a second portion 344. The second portion 344 of each protrusion 334, 335 may extend generally perpendicularly to the respective first portions 342, such that the protrusions 334, 335 each define a T-shaped cross section. The protrusions 334, 335 advantageously improve the rigidity of each of the impingement members 302, and therefore they improve the rigidity of the overall impingement cooling apparatus 300. Increased rigidity of the impingement cooling apparatus 300 may prevent damage caused by vibrational forces of the gas turbine 10 during operation. For example, the protrusions 334, 335 may give the impingement cooling apparatus 300 a more desirable natural frequency, in order to prevent failures of the impingement cooling apparatus 300 caused by minute oscillations of the integrated combustion nozzle 100.

As shown in FIGS. 19 and 20, each of the cross-supports 346 may include a first support 348 bar and a second support bar 350, which intersect with one another at an intersection point 352 (FIG. 19) disposed within the internal volume 332 of the impingement member 302. In particular embodiments, the first support bar 348 and the second support bar 350 of each of the cross-supports 346 may extend between the first protrusion 334 and the second protrusion 335. More specifically, the first support bar 348 and the second support bar 350 of each of the cross-supports 346 may extend directly between the second portions 344 of the first protrusion 334 and the second portion 344 of the second protrusion 335. In other embodiments (not shown), the first support bar 348 and the second support bar 350 of each of the cross-supports may extend directly between the interior of the impingement wall and the interior of the solid wall, such that there are no protrusions present.

In many embodiments, as shown in FIG. 19, the first support bar 348 and the second support bar may each form an angle 354 with the flange 310 that is oblique, i.e., not parallel or perpendicular. For example, in some embodiments, the first support bar 348 and the second support bar 350 may each form an angle 354 with the flange 310 that is between about 15° and about 75°. In other embodiments, the first support bar 348 and the second support bar 350 may each form an angle 354 with the flange 310 that is between about 25° and about 65°. In various embodiments, the first support bar 348 and the second support bar 350 may each form an angle 354 with the flange 310 that is between about 35° and about 55°. In particular embodiments, the first support bar 348 and the second support bar 350 may each form an angle 354 with the flange 310 that is between about 40° and about 50°. The angle 354 advantageously provide additional structural integrity and internal bracing to each of the impingement members 302, which prevents damage due to the vibrational forces of the gas turbine 10. Additionally, as discussed below, the angle 354 of the support bars 348, 350 allows the impingement members 302 to be additively manufactured without defects or deformation. For example, when being additively manufactured layer by layer, such as with the additive manufacturing system 1000 described herein, the angle of the support bars 348, 350 advantageously prevents the cross-supports 346 from otherwise detrimental overhang, which could cause deformation and/or a total collapse of the component. For example, a support bar extending perpendicularly across the impingement member 302 may be difficult and/or impossible to manufacture using an additive manufacturing system. Thus, the angle 354 between the support bars 348, 350 and the flange 310 is favorable.

In many embodiments, as shown in FIGS. 17-20 collectively, the impingement cooling apparatus 300 may further include stand-offs 356, 358 that extend from each of the impingement members 302. The stand-offs 356, 358 may be shaped as substantially flat plates that extend outwardly from the impingement members 302. In many embodiments, the stand-offs may space apart each impingement member 302 from surrounding surfaces, such as neighboring impingement members 302 and/or the walls 116, 118 of the combustion liner 110. The stand-offs 356, 358 may be configured to keep the impingement members 302 at the desired distance from the surrounding surfaces, in order to optimize the impingement cooling of the combustion liner 310 and the recirculation of the post impingement air 154 into the collection passageway 174.

In particular embodiments, the stand-offs may include side wall stand-offs 356 and impingement wall stand-offs 358. As shown in FIG. 17, in many embodiments, at least one side wall stand-off 356 and at least one impingement wall stand-off 358 may be disposed proximate the flange 310, 311 on each impingement member 302. in various embodiments, at least one side wall stand-off 356 and at least one impingement wall stand-off 358 may disposed proximate the closed end 312 of each impingement member 302 of the plurality of impingement members 302. Arranging the stand-offs 356, 358 proximate the first end 306 and second end 308 of the impingement cooling apparatus 300 may advantageously provide more uniform support and spacing between neighboring impingement members 302 and between impingement members 302 and the walls 116, 118 of the combustion liner 110.

In particular embodiments, as shown in FIG. 20, the side wall stand-offs 356 may each extend from and couple the first solid side wall 328 of an impingement member 302 to the second solid side wall 330 of a neighboring impingement member 302. In exemplary embodiments, the length of the side wall stand-offs 356 may set the distance of the gap 172 and may couple adjacent impingement members 302 together. For example, the impingement members 302 in a row, e.g. the first row 320 and/or second row 322, may be linked to the neighboring impingement members 302 within that row via one or more of the side wall stand-offs 356. In this way, the side wall stand-offs 356 function to maintain adequate space between the impingement members 302. In addition, the side wall stand-offs 356 advantageously prevent deformation of the relatively slender impingement members 302 during the additive manufacturing process by providing additional structural support to the impingement cooling apparatus 300.

In various embodiments, as shown in FIGS. 18, The impingement wall stand-offs 358 may function to maintain adequate space between the impingement members 302 and one of the walls 116, 118 of the combustion liner 110. For example, in exemplary embodiments, the impingement wall stand-offs 358 may extend from the impingement wall 314 and contact one of the walls 116, 118 of the combustion liner 310, which may be one of the first side wall 116 or the second side wall 118 of the combustion liner 310. For example, unlike the side wall stand-offs 356, the impingement wall stand-offs 358 are not coupled on both ends, but they are integrally formed with the impingement wall 314 on one end and in contact with the interior surface of either the pressure side wall 116 or the suction side wall 118 once the impingement cooling apparatus 300 is installed into the combustion liner 110. In this way, the impingement wall stand-offs 358 may be removably coupled to the combustion liner 110. In exemplary embodiments, the length of the side wall stand-offs 358 may set the distance of the gap disposed between the impingement wall 314 and the wall 116 or 118 of the combustion liner 310.

Figure 21:
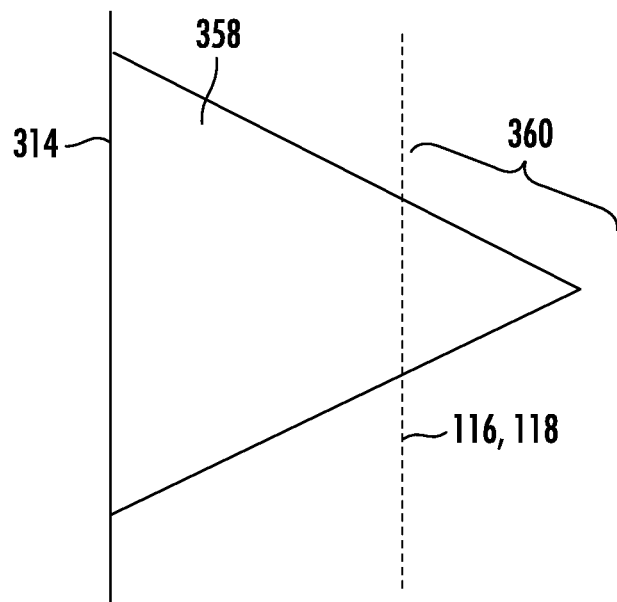
FIG. 21 is an enlarged view of an impingement wall stand-off prior to the removal of excess material, in accordance with embodiments of the present disclosure.
Figure 22:
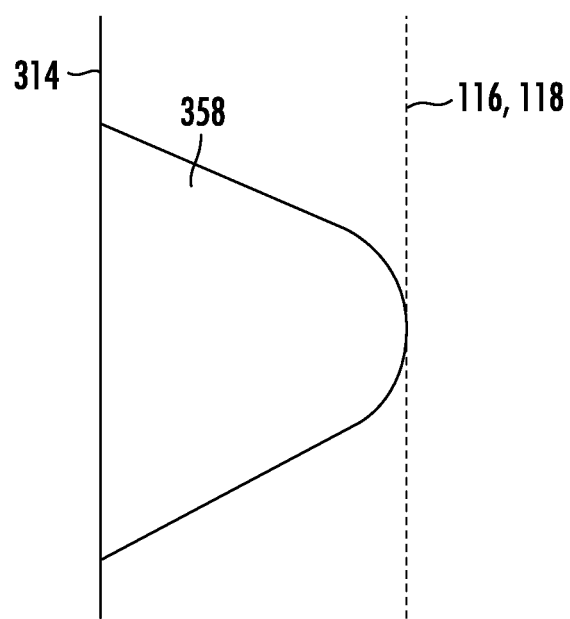
FIG. 22 is an enlarged view of an impingement wall stand-off after the removal of excess material, in accordance with embodiments of the present disclosure.

FIGS. 21 and 22 illustrate an enlarged view of an impingement wall stand-off 358 extending from an impingement wall 314 of an impingement member 302 to one of the walls 116, 118 of the combustion liner 310 (shown as a dashed line), in accordance with embodiments of the present disclosure. More specifically, FIG. 20 illustrates an impingement wall stand-off 358 immediately after being manufactured, e.g., by the additive manufacturing system 1000, but prior to any post machining. In many embodiments, each of the impingement wall stand-offs may be manufactured having excess material or length 360, as illustrated by the length 360 of the stand-off 358 that extends beyond the wall 116 or 118. As shown in FIG. 21, the excess material or length 360 of the stand-off 358 may be removed, in order to maintain the desired tolerance between the impingement wall 314 and the wall 116, 118 for optimal cooling performance.

Although FIG. 22 illustrates an exemplary embodiment of an impingement wall stand-off 358 of the impingement cooling apparatus 300, FIG. 21 may be representative of the various other stand-offs disclosed herein (such as the stand-offs disposed on the impingement panel 130 and/or the stand-offs disposed on the cooling insert 400).

In particular embodiments, each row of impingement members 320, 322 in the impingement cooling apparatus 300 may be integrally formed as a single component. That is, each of the subcomponents, e.g., one of the flanges 310, 311, the impingement members 302, the first protrusion 334, the second protrusion 335, the plurality of cross supports346, the stand-offs 356, 358, and any other subcomponent of each row 320, 322 of impingement members 302, may be manufactured together as a single body. In exemplary embodiments, this may be done by utilizing the additive manufacturing system 1000 described herein. However, in other embodiments, other manufacturing techniques, such as casting or other suitable techniques, may be used. In this regard, utilizing additive manufacturing methods, each row 320, 322 of impingement members 302 may be integrally formed as a single piece of continuous metal, and may thus include fewer sub-components and/or joints compared to prior designs. The integral formation of each row 320, 322 of impingement members 302 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. In some embodiments (not shown), the entire impingement cooling apparatus 300 may be integrally formed as a single component. In such embodiments, the impingement cooling apparatus may have a single flange, rather than a first flange 310 and a second flange 311, from which all of the impingement members 302 extend.

Figure 23:
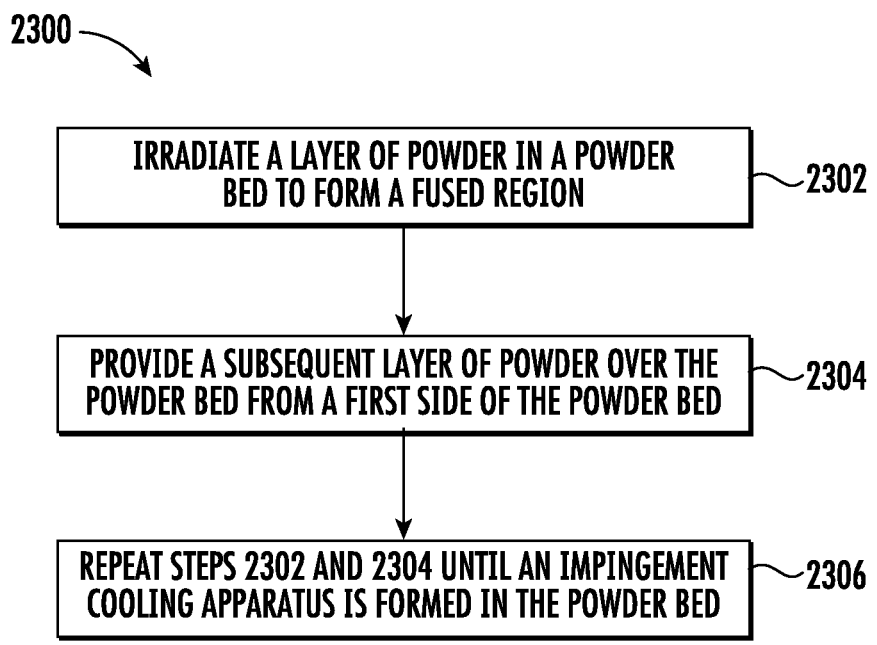
FIG. 23 is a flow chart a method for fabricating an impingement cooling apparatus, in accordance with embodiments of the present disclosure.

FIG. 23 is a flow chart of a sequential set of steps 2302 through 2306, which define a method 2300 of fabricating an impingement cooling apparatus 300, in accordance with embodiments of the present disclosure. The method 2300 may be performed using an additive manufacturing system, such as the additive manufacturing system 1000 described herein or another suitable system. As shown in FIG. 23, the method 2300 includes a step 2302 of irradiating a layer of powder in a powder bed 1120 to form a fused region. In many embodiments, as shown in FIG. 15, the powder bed may be disposed the build plate 1002, such that the fused region is fixedly attached to the build plate 1002. The method 2300 may include a step 2304 of providing a subsequent layer of powder over the powder bed 1120 from a first side of the powder bed 1120. The method 2300 further includes a step 2306 of repeating steps 2302 and 2304 until the impingement cooling apparatus 300 is formed in the powder bed 1120.

Figure 24:
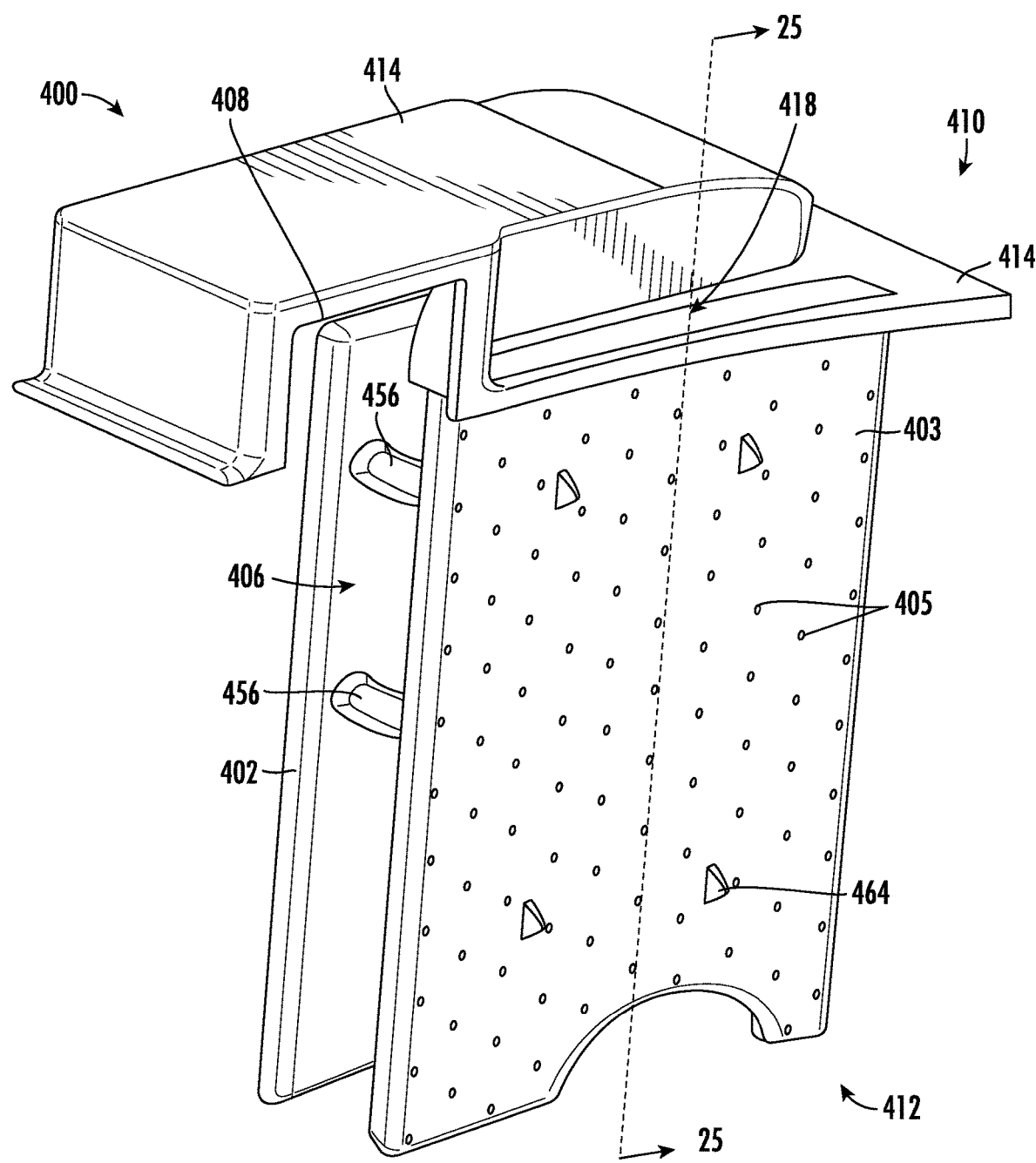
FIG. 24 is a perspective view of a cooling insert, which is isolated from the other components of the integrated combustor nozzle, in accordance with embodiments of the present disclosure.

FIG. 24 illustrates a perspective view of a cooling insert 400, which is isolated from the other components of the integrated combustor nozzle 100, in accordance with embodiments of the present disclosure. As shown in FIG. 24, the cooling insert 400 may extend between a first end 410 and a second end 412. In many embodiments, the cooling insert 400 includes a flange 414 that extends between and generally surrounds the walls 402, 403 at the first end 410 of the cooling insert 400. In many embodiments, the flange 414 may define one or more openings that provide fluid communication between cooling insert 400, the high pressure plenum 34, and/or one or more of the impingement panels 130 described herein. In various embodiments, the flange 414 may couple the cooling insert 400 to one of the inner liner segment 106 or the outer liner segment 108. As discussed below in more detail, the flange 414 may define both the first open end 418 and the second open end 428, in order to provide fluid communication between the high pressure plenum 34 and the first wall and second wall of the cooling insert 400. In this way, the first open end 418 and the second open 428 end defined within the flange 414 may serve as a high pressure air inlet. In many embodiments, the cooling insert 400 may further include a low pressure inlet 408 defined within the flange 414. As shown best in FIGS. 6 and 9, the low pressure inlet 408 may provide for fluid communication between the collection ducts 142 of the impingement panels 130 and the collection passageway 406 of the cooling insert 400 (FIG. 9).

Figure 25:
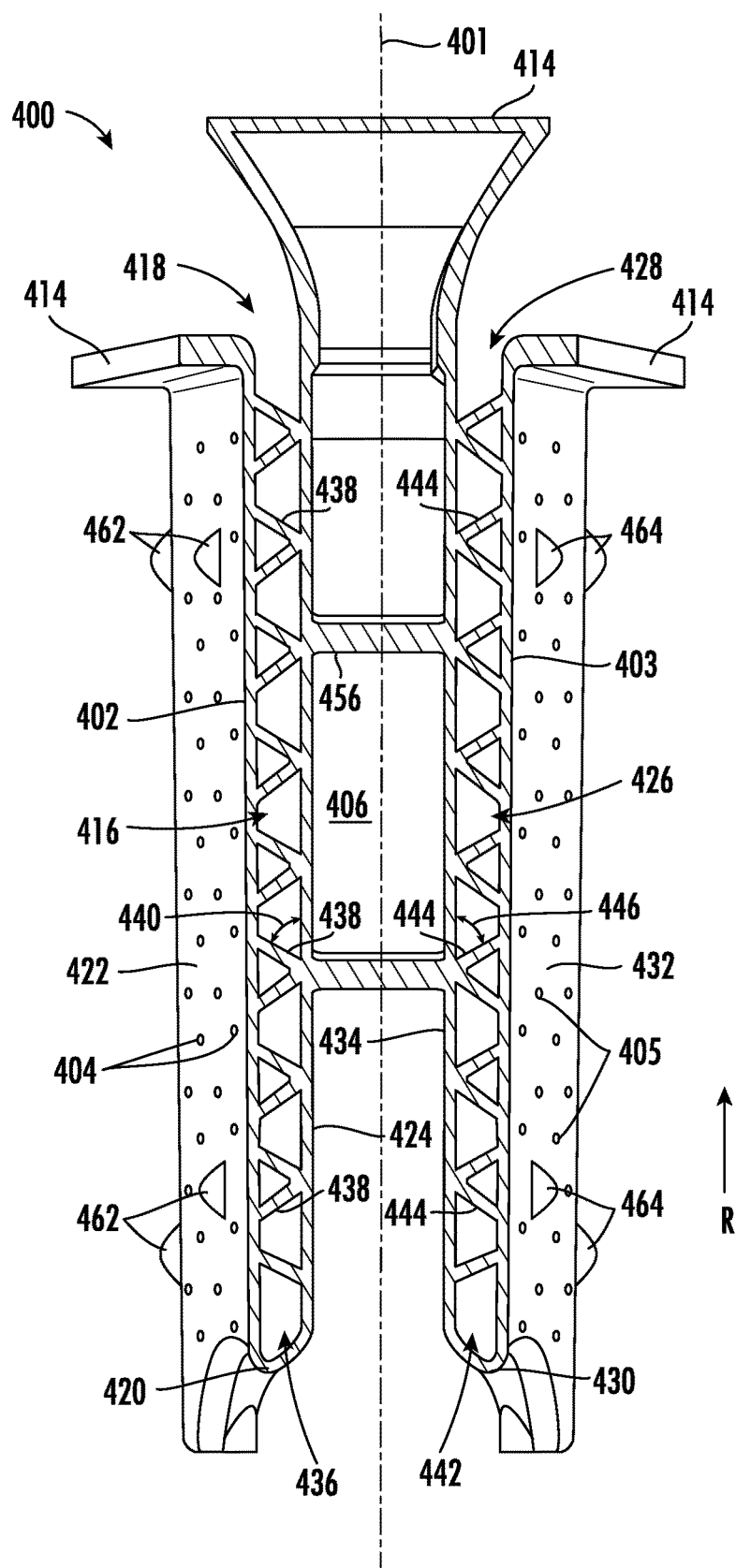
FIG. 25 is a cross-sectional view of a cooling insert from along the axial direction A of the turbomachine, in accordance with embodiments of the present disclosure.
Figure 26:
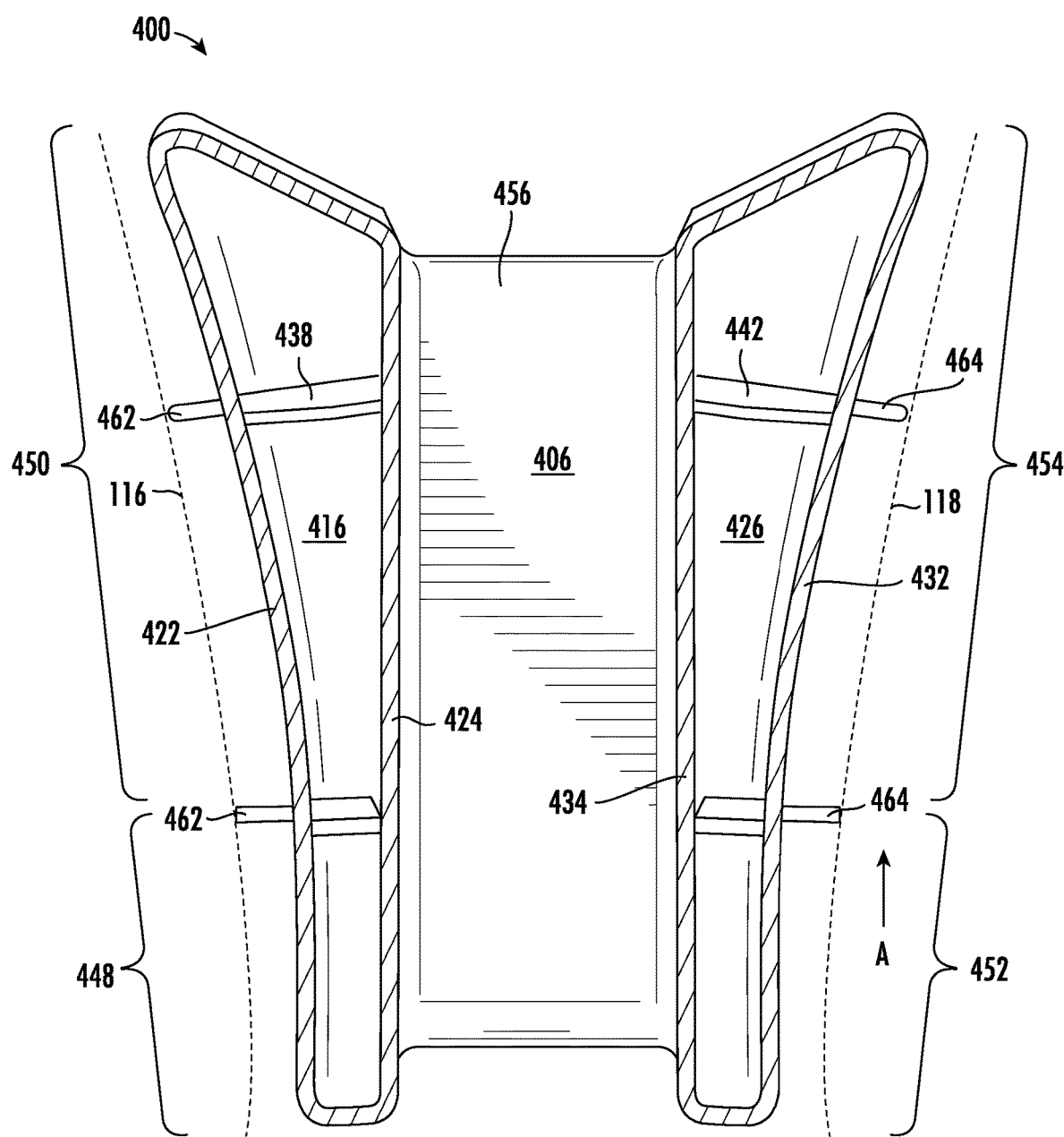
FIG. 26 is a cross-sectional view of a cooling insert from along the radial direction R of the turbomachine, in accordance with embodiments of the present disclosure.
Figure 27:
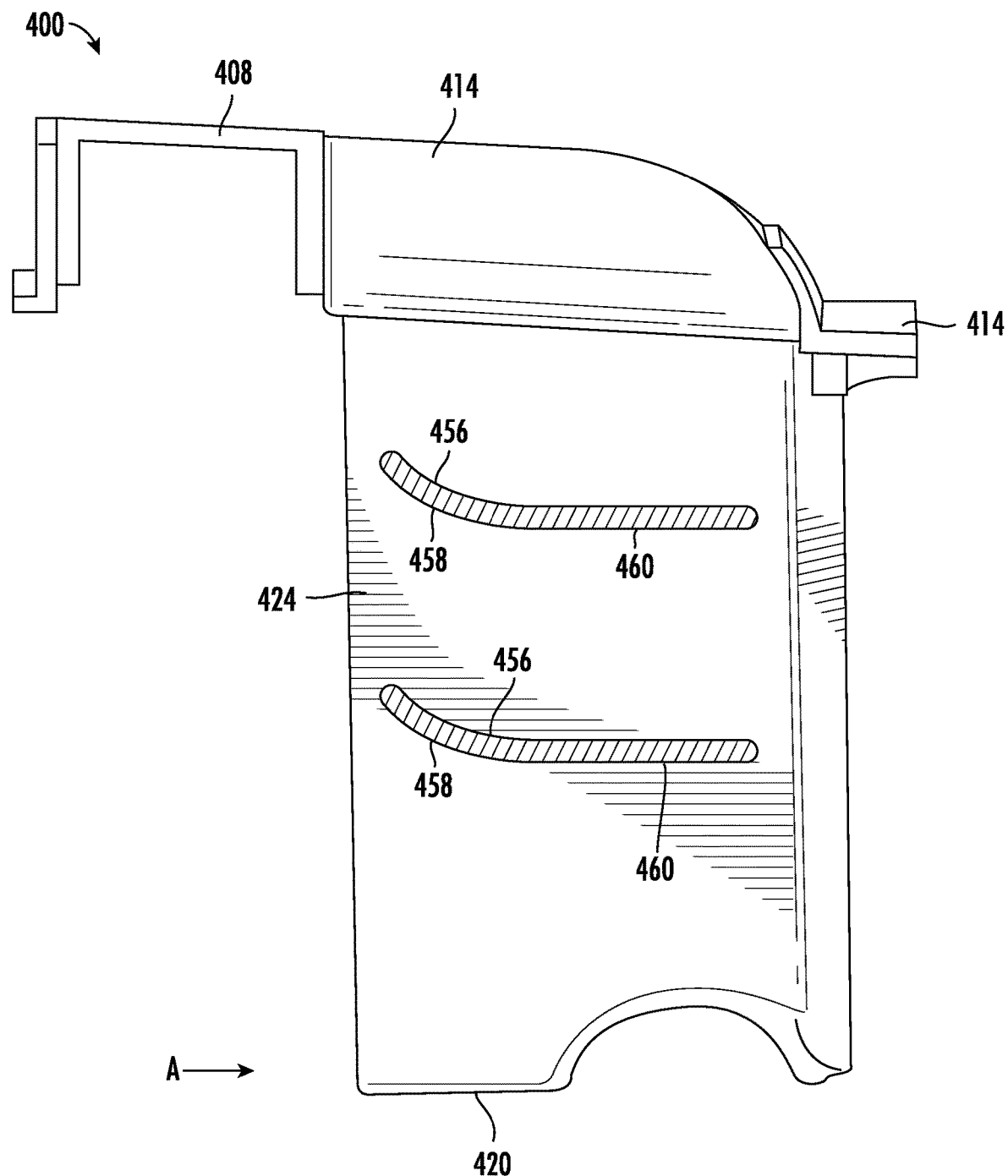
FIG. 27 is a cross-sectional view of a cooling insert from along the circumferential direction C of the turbomachine, in accordance with embodiments of the present disclosure.

FIG. 25 illustrates a cross-sectional view of a cooling insert 400 from along the axial direction A, FIG. 26 illustrates a cross-sectional view from along the radial direction R, and FIG. 27 illustrates a cross-sectional of a cooling insert 400 from along the circumferential direction C, in accordance with embodiments of the present disclosure. As shown in FIG. 25, the cooling insert 400 may include an axial centerline 401 that extends between the walls 402, 403 of the cooling insert. In exemplary embodiments, when the cooling insert 400 is installed into an integrated combustor nozzle 100, the axial centerline 401 may coincide with the radial direction R of the gas turbine 10.

As shown in FIG. 25, the cooling insert 400 may include a first wall 402 that defines a first passage 416 therein. As shown, the first wall 402 may extend generally radially from a first open end 418 defined within the flange 414 to a first closed end 420. In this way, the first wall 402 may be a substantially hollow body that receives air from the high pressure plenum 34 via the first open end 418 defined in the flange 414. In particular embodiments, the first wall 410 includes a first impingement side 422 spaced apart from a first solid side 424. As shown, the first passage 416 may be defined directly between the first impingement side 422 and the first solid side 424. In various embodiments, the first impingement side 422 may define a first plurality of impingement apertures 404, which may be configured to direct air from the first passage 416 towards the first side wall (e.g. the pressure side wall 116) of the combustion liner 110 (FIG. 5). In many embodiments, the first plurality of impingement apertures 404 may be sized and oriented to direct the pre-impingement air 152 in discrete jets to impinge upon the interior surface 156 of the pressure side wall 116. The discrete jets of air impinge (or strike) the interior surface 156 and create a thin boundary layer of air over the interior surface 156 which allows for optimal heat transfer between the pressure side wall 116 and the air.

Similarly, the cooling insert 400 may further include a second wall 403 spaced apart from the first wall 402. In many embodiments, the second wall 403 may define a second passage 426 therein. As shown, the first wall 402 may extend generally radially from a second open end 428 defined within the flange 414 to a second closed end 430. In this way, the second wall 403 may be a substantially hollow body that receives air from the high pressure plenum 34 via the second open end 428 defined in the flange 414. In particular embodiments, the second wall 403 includes a second impingement side 432 spaced apart from a second solid side 434. As shown, the second passage 426 may be defined directly between the second impingement side 432 and the second solid side 434. In various embodiments, the second impingement side 432 may define a second plurality of impingement apertures 405, which may be configured to direct air from the second passage 426 towards the second side wall (e.g. the suction side wall 118) of the combustion liner 110 (FIG. 5). In many embodiments, the second plurality of impingement apertures 405 may be sized and oriented to direct the pre-impingement air 152 in discrete jets to impinge upon the interior surface 158 of the suction side wall 118. The discrete jets of air impinge (or strike) the interior surface 158 (FIG. 6) and create a thin boundary layer of air over the interior surface 158 which allows for optimal heat transfer between the suction side wall 118 and the air.

As used herein, the term "solid" may refer to a wall or walls that are impermeable, such that they do not allow air or other fluids to pass therethrough. For example, the first solid side 424 and the second solid side 434 may not have any impingement apertures, holes, or voids that would allow for pre-impingement air 152 to escape, in order to ensure all of the air gets directed towards the interior surface 156, 158 of the walls 116, 118 for cooling.

As shown in FIG. 25, the first wall 402 may include a first row 436 of supports 438 that extend between first impingement side 422 and the first solid side 424. For example, in some embodiments each support 438 may extend directly between the first impingement side 422 and the first solid side 424, such that they advantageously provide additional structural integrity to the first wall 402. As shown in FIG. 25, each support 438 in the first row 436 of supports 438 may form an oblique angle 440 with the first solid side 424, which allows the supports 438 to be manufactured with the first wall 402 via an additive manufacturing system (such as the additive manufacturing system 1000 described herein). For example, in many embodiments, each support 438 in the first row 436 of supports 438 may form an oblique angle 440 with the first solid side wall 424 that is between about 10° and about 80°. In other embodiments, each support 438 in the first row 436 of supports 438 may form an oblique angle 440 with the first solid side wall 424 that is between about 20° and about 70°. In particular embodiments, each support 438 in the first row 436 of supports 438 may form an oblique angle 440 with the first solid side wall 424 that is between about 30° and about 60°. In many embodiments, each support 438 in the first row 436 of supports 438 may form an oblique angle 440 with the first solid side wall 424 that is between about 40° and about 50°.

Likewise, the second wall 403 may include a second row 442 of supports 444 that extend between second impingement side 432 and the second solid side 434. For example, in some embodiments each support 444 in the second row 442 of supports 444 may extend directly between the second impingement side 432 and the second solid side 434, such that they advantageously provide additional structural integrity to the second wall 403. As shown in FIG. 25, each support 444 in the second row 442 of supports 444 may form an oblique angle 446 with the second solid side 434, which allows the supports 444 to be manufactured with the second wall 403 via an additive manufacturing system (such as the additive manufacturing system 1000 described herein). For example, the in many embodiments, each support 444 in the second row 442 of supports 444 may form an oblique angle 446 with the second solid side wall 434 that is between about 10° and about 80°. In other embodiments, each support 444 in the second row 442 of supports 444 may form an oblique angle 446 with the second solid side wall 434 that is between about 20° and about 70°. In particular embodiments, each support 444 in the second row 442 of supports 444 may form an oblique angle 446 with the second solid side wall 434 that is between about 30° and about 60°. In many embodiments, each support 444 in the second row 442 of supports 444 may form an oblique angle 446 with the second solid side wall 434 that is between about 40° and about 50°.

The oblique angle 440, 446 of the supports 438, 444 allows the walls 402, 403 to be additively manufactured with minimal or no defects or deformation. For example, when being additively manufactured layer by layer, such as with the additive manufacturing system 1000 described herein, the oblique angle 440, 446 of the supports 438, 444 advantageously prevents the supports 438, 444 from otherwise detrimental overhang, which could cause deformation and/or a total collapse of the component. For example, a support extending perpendicularly across the impingement may be difficult and/or impossible to manufacture using an additive manufacturing system. Thus, the oblique angle 440, 446 between the supports 438, 444 and solid wall 424, 434 is favorable.

As shown in FIG. 26, the first impingement side 422 may include a first contour that corresponds with the first wall, e.g., the pressure side wall 116. Similarly, in many embodiments, the second impingement side may include a second contour that corresponds with the second wall, e.g., the suction side wall 116. In this way, the impingement sides 422, 432 may each maintain a constant spacing from the respective side walls 116, 118 in the axial direction A, which optimizes impingement cooling thereto. As used herein, a contours that "correspond" with one another may mean two or more walls or surfaces that each have matching or generally identical curvatures in one or more directions.

In many embodiments, as shown in FIG. 26, the first impingement side 422 may diverge away from the first solid wall 424 as they extend in the axial direction A. Similarly, the second impingement side 432 may diverge away from the second solid wall 434 as they extend in the axial direction A. More specifically, the first wall 402 may include a first parallel portion 448 and a first diverging portion 450. The first parallel portion 448 of the first wall 402 may be disposed proximate the forward end of the cooling insert 400. As shown in FIG. 26, in the first parallel portion 448, the first impingement side 422 may be generally parallel to the first solid side 424. The first diverging portion 450 of the first wall 402 may extend continuously from the first parallel portion 448. In the first diverging portion 450, the first impingement side 422 may gradually diverge away from the first solid wall 424 as they extend in the axial direction A, such that the gap between the walls gradually increases in the axial direction A. Likewise, the second wall 403 may include a second parallel portion 452 and a second diverging portion 454. The second parallel portion 452 of the second wall 403 may be disposed proximate the forward end of the cooling insert 400. As shown in FIG. 26, in the second parallel portion 452, the second impingement side 432 may be generally parallel to the second solid side 434. The second diverging portion 454 of the second wall 403 may extend continuously from the second parallel portion 452. In many embodiments, in the second diverging portion 452, the second impingement side 432 may gradually diverge away from the second solid wall 434 as they extend in the axial direction A, such that the gap between the walls gradually increases in the axial direction A.

In particular embodiments, a collection passageway 406 may be defined between the first solid side 424 and the second solid side 434. For example, in many embodiments, the first solid side 424 and the second solid side 434 may be spaced apart from one another, such that the collection passageway 406 is defined therebetween. In many embodiments, the first solid side 424 and the second solid side 434 may each be substantially flat plates that extend parallel to one another in both the axial direction A and the radial direction R. The collection passageway 406 may receive low pressure air (relative to the high pressure pre-impingement air) from one or more sources and guide said low pressure air to a fuel injector 160, 161 for usage in the secondary combustion zone 104. For example, the collection passageway 406 may receive a first source of low pressure air from one or more of the impingement panel 130 collection ducts 142, which is coupled to the cooling insert 400 via the low pressure inlet 408 defined within the flange 414. Another source of low pressure air for the collection passageway 406, as shown in FIG. 6, may be post-impingement air 154, which has exited the impingement sides and impinged upon the walls 116, 118.

As shown in FIGS. 24-27 collectively, at one or more guide vanes 456 may extend between the first solid side 424 and the second solid side 434, in order to guide low pressure air towards the fuel injectors 160, 161. In various embodiments, each guide vane 456 may extend directly between the first solid side 424 and the second solid side 434, thereby coupling the first wall 402 of the cooling insert 400 to the second wall 403 of the cooling insert 400. In particular embodiments, the guide vane 456 may be disposed within the collection passageway 406 such that low pressure air may travel along the guide vane 456 towards the fuel injectors 160, 161. In many embodiments, each of the guide vanes 456 may include an arcuate portion 458 and a straight portion 460 that extend continuously with one another. The arcuate portion 458 may be disposed proximate the forward end of the cooling insert 400. The straight portion 460 of the guide vane 456 may extend from the arcuate portion 458 towards the aft end of the cooling insert 400. In many embodiments, the straight portion 460 of the guide vane may be generally parallel to the axial direction A when the cooling insert is installed in an integrated combustor nozzle 100.

As shown in FIGS. 24-26 collectively, the first impingement side may include a first set of stand-offs 462 that, when the cooling insert 400 is installed within an integrated combustor nozzle 100, extend from the first impingement side 422 to the first side wall (e.g. the pressure side wall 116). Similarly, in many embodiments, the second impingement side includes a second set of stand-offs 464 that extend from the second impingement side 432 to the second side wall (e.g. the suction side wall 118). Each set of stand-offs 462, 464 may function to maintain adequate space between the impingement sides 422, 432 and one of the walls 116, 118 of the combustion liner 110. For example, in exemplary embodiments, the stand-offs may extend from each respective impingement side and contact a wall 116, 118 of the combustion liner 110. For example, stand-offs are not coupled on both ends, but they are integrally formed with the impingement side 422, 432 on one end and in contact with the interior surface of either the pressure side wall 116 or the suction side wall 118 once the cooling insert 400 is installed into the combustion liner 110. In this way, the stand-offs 462, 464 may be removably coupled to the combustion liner 110. In exemplary embodiments, the length of the stand-offs 462, 464 may set the distance of the gap disposed between the impingement side and the wall 116, 118 of the combustion liner 110.

Figure 28:
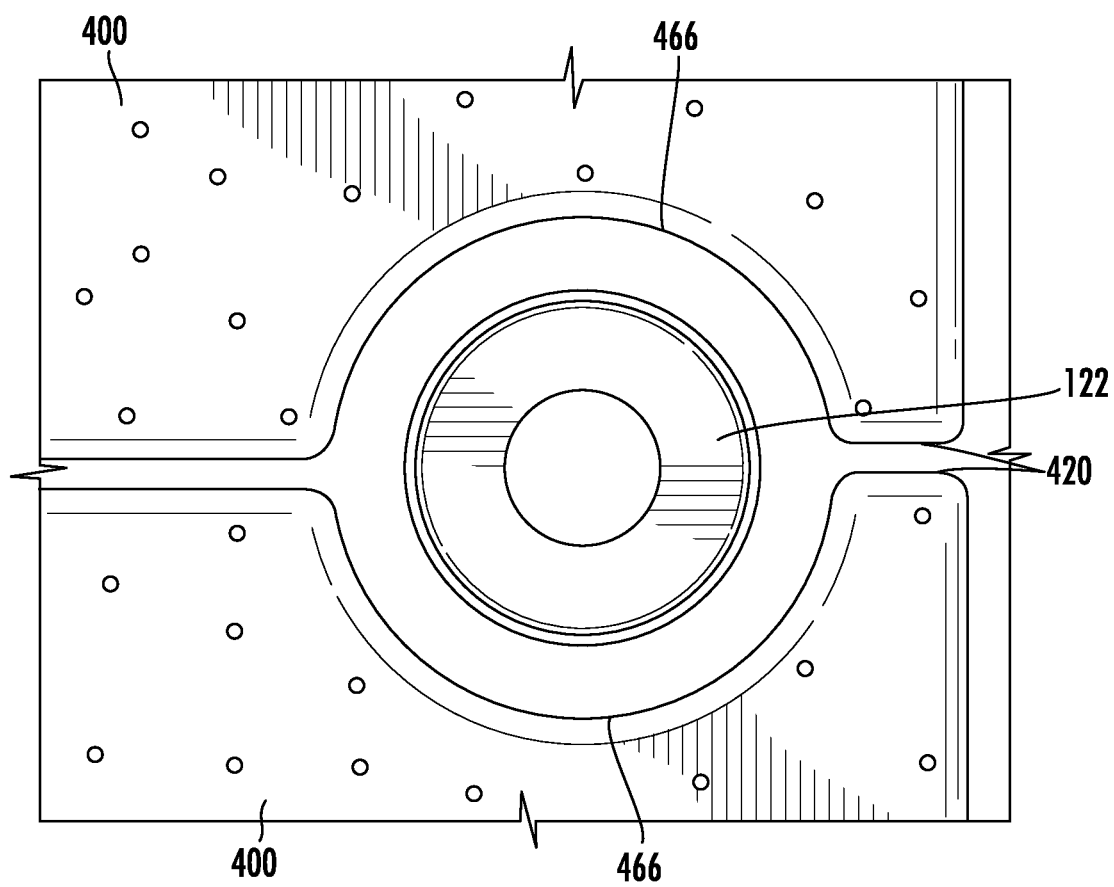
FIG. 28 is an enlarged view of two oppositely disposed cooling inserts, in accordance with embodiments of the present disclosure.

FIG. 28 illustrates an enlarged view of two oppositely disposed cooling inserts 400, in accordance with embodiments of the present disclosure. More specifically, FIG. 25 illustrates the closed end 420 of two oppositely disposed cooling inserts 400. In particular embodiments, each closed end 420 may include an arcuate portion 466 that curves around the cross fire tube 122. In other embodiments (not shown), in which the cross fire tube is not preset, the closed ends may extend straight across (e.g. in the axial direction A).

In many embodiments, each of the cooling inserts 400 may be integrally formed as a single component. That is, each of the subcomponents, e.g., the first wall 402, the second wall 403, the flange 414, the guide vane 456, the standoffs 462, 464, and any other subcomponent of the cooling insert 400, may be manufactured together as a single body. In exemplary embodiments, this may be done by utilizing the additive manufacturing system 1000 described herein. However, in other embodiments, other manufacturing techniques, such as casting or other suitable techniques, may be used. In this regard, utilizing additive manufacturing methods, the cooling insert 400 may be integrally formed as a single piece of continuous metal, and may thus include fewer sub-components and/or joints compared to prior designs. The integral formation of the cooling insert 400 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An integrated combustor nozzle comprising:
a combustion liner extending along a radial direction between an inner liner segment and an outer liner segment, the combustion liner including a forward end portion, an aft end portion, a pressure side wall, and a suction side wall, the aft end portion of the combustion liner defining a turbine nozzle; and
an impingement panel comprising:
an impingement plate defining an inner surface and an outer surface, the inner surface spaced apart from and extending along an exterior surface of one of the inner liner segment or the outer liner segment such that a cooling flow gap is defined between the inner surface and the exterior surface, wherein the impingement plate defines a plurality of impingement apertures that direct coolant in discrete jets towards the exterior surface of the one of the inner liner segment or the outer liner segment;
a collection duct spaced apart from the impingement plate and defining a collection passage;
an inlet portion including side walls that extend from the outer surface of the impingement plate to the collection duct; and
at least one support extending between and coupled to the impingement plate, a side wall of the inlet portion, and the collection duct.

2. The integrated combustor nozzle as in claim 1, wherein the at least one support extends from a first end fixedly coupled to the impingement plate to a second end fixedly coupled to the collection duct.

3. The integrated combustor nozzle as in claim 2, wherein the at least one support includes a first side and a second side that extend between the first end and the second end, and wherein the first side is fixedly coupled to the inlet portion.

4. The integrated combustor nozzle as in claim 3, wherein the second side of the at least one support forms an angle with the impingement plate that is between about 10° and about 75°.

5. The integrated combustor nozzle as in claim 1, wherein the at least one support forms an angle with the inlet portion that is between about 10° and about 90°.

6. The integrated combustor nozzle as in claim 1, wherein the impingement panel comprises a plurality of impingement panel segments coupled together.

7. The integrated combustor nozzle as in claim 6, wherein each impingement panel segment of the plurality of impingement panel segments extends between a first end of the impingement panel segment and a second end of the impingement panel segment, and wherein the first end includes a flange that extends from the impingement plate of the impingement panel segment, the flange integrally formed with the impingement panel segment.

8. The integrated combustor nozzle as in claim 7, wherein an end plate is fixedly coupled to the second end of at least one impingement panel segment of the plurality of impingement panel segments, and wherein the end plate couples the second end of the at least one impingement panel segment to a respective flange of a neighboring impingement panel segment.

9. The integrated combustor nozzle as in claim 8, wherein the flange is generally perpendicular to the impingement plate.

10. The integrated combustor nozzle as in claim 1, wherein one or more cavities are defined between the pressure side wall and the suction side wall, the one or more cavities spaced apart from the collection duct.

11. A method for fabricating an impingement panel, comprising:
   an integrated combustor nozzle comprising:
      a combustion liner extending along a radial direction between an inner liner segment and an outer liner segment, the combustion liner including a forward end portion, an aft end portion, a pressure side wall, and a suction side wall, the aft end portion of the combustion liner defining a turbine nozzle; and
   the impingement panel comprising:
      an impingement plate defining an inner surface and an outer surface, the inner surface spaced apart from and extending along an exterior surface of one of the inner liner segment or the outer liner segment such that a cooling flow gap is defined between the inner surface and the exterior surface, wherein the impingement plate defines a plurality of impingement apertures that direct coolant in discrete jets towards the exterior surface of the one of the inner liner segment or the outer liner segment;
      a collection duct spaced apart from the impingement plate and defining a collection passage;
      an inlet portion including side walls that extend from the outer surface of the impingement plate to the collection duct; and
      at least one support extending between and coupled to the impingement plate, a side wall of the inlet portion, and the collection duct;
   the method of fabricating the impingement panel further comprising:
      (a) irradiating a layer of powder in a powder bed to form a fused region, the powder bed disposed on a build plate;
      (b) providing a subsequent layer of powder over the powder bed by passing a recoater arm over the powder bed from a first side of the powder bed; and
      (c) repeating steps (a) and (b) until the impingement panel is formed on the build plate.

\* \* \* \* \*